United States Patent
Joshi et al.

(10) Patent No.: US 12,155,731 B2
(45) Date of Patent: Nov. 26, 2024

(54) PLATFORM-AS-A-SERVICE DEPLOYMENT INCLUDING SERVICE DOMAINS

(71) Applicant: Nutanix, Inc., San Jose, CA (US)

(72) Inventors: Akhilesh Joshi, San Jose, CA (US); Amit Jain, San Jose, CA (US); Sanika Mokashi, San Jose, CA (US); Bryan Crowe, San Jose, CA (US); Satyam B. Vaghani, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/945,306

(22) Filed: Jul. 31, 2020

(65) Prior Publication Data

US 2021/0112128 A1  Apr. 15, 2021

Related U.S. Application Data

(60) Provisional application No. 62/913,115, filed on Oct. 9, 2019.

(51) Int. Cl.
*H04L 67/00* (2022.01)
*G06F 9/455* (2018.01)
(Continued)

(52) U.S. Cl.
CPC .......... *H04L 67/34* (2013.01); *G06F 9/45558* (2013.01); *G06F 18/214* (2023.01);
(Continued)

(58) Field of Classification Search
CPC ......... H04L 67/16; H04L 67/10; G06N 20/00; G06N 5/01; G06N 5/04; G06N 3/08;
(Continued)

(56) References Cited

U.S. PATENT DOCUMENTS 6,550,057 B1   4/2003  Bowman-Amuah
7,237,360 B2   7/2007  Moncho et al.
(Continued)

FOREIGN PATENT DOCUMENTS

CN   110795442 B   4/2022
EP   2831746 A1    2/2015
WO   9945465 A1    9/1999

OTHER PUBLICATIONS

U.S. Appl. No. 16/522,567, titled "Apparatus and Method for Deploying a Machine Learning Inference as a Service at Edge Systems", dated Jul. 25, 2019.
(Continued)

*Primary Examiner* — Ninos Donabed
(74) *Attorney, Agent, or Firm* — Stoel Rives LLP

(57) ABSTRACT

A platform-as-a-service (PaaS) manager abstracts deployment of PaaS software stacks to different computing platforms such that the PaaS software stacks provide a common platform to host an application despite differences in the underlying architectures of the computing platforms. Each PaaS software stack is hosted on a service domain installed on a respective one of the computing platforms, and includes an operating system and provides access to a set of services for execution of applications. The some examples, the different computing platforms include multiple different cloud architectures.

50 Claims, 35 Drawing Sheets

(51) Int. Cl.
*G06F 18/214* (2023.01)
*G06N 20/00* (2019.01)
*H04L 67/10* (2022.01)
*H04L 67/51* (2022.01)

(52) U.S. Cl.
CPC .............. *G06N 20/00* (2019.01); *H04L 67/10* (2013.01); *H04L 67/51* (2022.05); *G06F 2009/45562* (2013.01); *G06F 2009/45595* (2013.01)

(58) Field of Classification Search
CPC ...... G06N 7/01; G06N 3/045; G06F 9/45558; G06F 2009/45562; G06F 2009/45595; G06F 2009/4557; G06K 9/6256
See application file for complete search history.

(56) References Cited

U.S. PATENT DOCUMENTS

| | | | |
|---|---|---|---|
| 7,310,664 B1 | 12/2007 | Merchant et al. | |
| 8,543,665 B2 | 9/2013 | Ansari et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,210,534 B1 | 12/2015 | Matthieu et al. | |
| 9,244,951 B2* | 1/2016 | Mandelstein ......... | G06F 16/214 |
| 9,253,252 B2 | 2/2016 | Agarwal et al. | |
| 9,336,132 B1 | 5/2016 | Aron et al. | |
| 9,600,494 B2 | 3/2017 | Maluf et al. | |
| 9,606,794 B1* | 3/2017 | Chou ......................... | G06F 8/71 |
| 9,633,197 B2 | 4/2017 | Lakshmanan et al. | |
| 9,634,893 B2 | 4/2017 | Boutros et al. | |
| 9,641,650 B2 | 5/2017 | Virkki et al. | |
| 9,652,265 B1 | 5/2017 | Narayanasamy et al. | |
| 9,684,502 B2 | 6/2017 | Fu et al. | |
| 9,729,411 B2 | 8/2017 | Purusothaman | |
| 9,736,194 B1 | 8/2017 | Rao et al. | |
| 9,747,287 B1 | 8/2017 | Bhardwaj et al. | |
| 9,769,032 B1 | 9/2017 | Ghodsi et al. | |
| 9,772,866 B1 | 9/2017 | Aron et al. | |
| 9,836,296 B2 | 12/2017 | Vandikas et al. | |
| 9,860,677 B1 | 1/2018 | Agerstam et al. | |
| 9,917,865 B2 | 3/2018 | Arora et al. | |
| 9,977,415 B2 | 5/2018 | Zimmerman et al. | |
| 10,091,270 B2 | 10/2018 | Fang | |
| 10,149,154 B2 | 12/2018 | Zimmerman et al. | |
| 10,156,842 B2 | 12/2018 | Wu et al. | |
| 10,181,978 B1 | 1/2019 | Argenti | |
| 10,225,335 B2 | 3/2019 | Fu et al. | |
| 10,230,798 B2 | 3/2019 | Doraiswamy et al. | |
| 10,262,019 B1 | 4/2019 | Reiner et al. | |
| 10,291,714 B2 | 5/2019 | Mathews et al. | |
| 10,306,513 B2 | 5/2019 | Bartfai-walcott et al. | |
| 10,489,138 B1 | 11/2019 | Wu et al. | |
| 10,515,119 B2 | 12/2019 | Kirk et al. | |
| 10,534,629 B1* | 1/2020 | St. Pierre .............. | G06F 9/5055 |
| 10,567,925 B2 | 2/2020 | Ly et al. | |
| 10,652,226 B2 | 5/2020 | Islam et al. | |
| 10,685,295 B1 | 6/2020 | Ross et al. | |
| 10,769,113 B2 | 9/2020 | Jones | |
| 10,838,833 B1 | 11/2020 | Jibaja et al. | |
| 10,893,116 B1 | 1/2021 | Koehler | |
| 10,924,342 B2 | 2/2021 | Joshi et al. | |
| 11,178,213 B2 | 11/2021 | Desai et al. | |
| 11,194,483 B1 | 12/2021 | Dontu et al. | |
| 11,301,762 B1 | 4/2022 | Chen et al. | |
| 11,316,733 B1 | 4/2022 | Johson et al. | |
| 11,379,525 B1 | 7/2022 | Deutsch et al. | |
| 11,397,692 B2 | 7/2022 | Chhabra et al. | |
| 11,409,756 B1 | 8/2022 | Park et al. | |
| 11,422,863 B2 | 8/2022 | Sengupta et al. | |
| 11,429,893 B1 | 8/2022 | Tong | |
| 11,501,881 B2 | 11/2022 | Patil et al. | |
| 11,635,990 B2 | 4/2023 | Singh et al. | |
| 11,665,221 B2 | 5/2023 | Joshi et al. | |
| 2002/0143819 A1 | 10/2002 | Han et al. | |
| 2004/0177359 A1 | 9/2004 | Bauch et al. | |
| 2005/0060328 A1 | 3/2005 | Suhonen et al. | |
| 2008/0270515 A1* | 10/2008 | Chen ..................... | G06F 9/4856 709/201 |
| 2009/0204711 A1 | 8/2009 | Binyamin | |
| 2009/0260004 A1 | 10/2009 | Datta et al. | |
| 2010/0008510 A1 | 1/2010 | Zayas | |
| 2010/0077473 A1 | 3/2010 | Takeshita et al. | |
| 2010/0175061 A1 | 7/2010 | Maeda et al. | |
| 2011/0153824 A1 | 6/2011 | Chikando et al. | |
| 2011/0231899 A1 | 9/2011 | Pulier et al. | |
| 2011/0251992 A1 | 10/2011 | Bethlehem et al. | |
| 2011/0265077 A1 | 10/2011 | Collison et al. | |
| 2012/0102486 A1 | 4/2012 | Yendluri | |
| 2012/0167081 A1 | 6/2012 | Sedayao et al. | |
| 2012/0265884 A1 | 10/2012 | Zhang et al. | |
| 2012/0266156 A1 | 10/2012 | Spivak et al. | |
| 2012/0281708 A1 | 11/2012 | Chauhan et al. | |
| 2013/0219479 A1 | 8/2013 | Desoto et al. | |
| 2013/0227573 A1 | 8/2013 | Morsi et al. | |
| 2013/0304903 A1 | 11/2013 | Mick et al. | |
| 2013/0332916 A1 | 12/2013 | Chinn et al. | |
| 2014/0074539 A1 | 3/2014 | Doering et al. | |
| 2014/0075412 A1 | 3/2014 | Kannan et al. | |
| 2014/0075431 A1 | 3/2014 | Kumar et al. | |
| 2014/0164486 A1* | 6/2014 | Ravichandran ......... | H04L 67/10 709/203 |
| 2014/0279899 A1 | 9/2014 | Gu et al. | |
| 2014/0317261 A1 | 10/2014 | Shatzkamer et al. | |
| 2014/0330948 A1 | 11/2014 | Dunn et al. | |
| 2014/0372508 A1 | 12/2014 | Fausak et al. | |
| 2015/0057817 A1 | 2/2015 | Endrizzi et al. | |
| 2015/0067030 A1* | 3/2015 | Smith ..................... | H04L 67/04 709/203 |
| 2015/0074106 A1 | 3/2015 | Ji | |
| 2015/0120893 A1 | 4/2015 | Sapaliga et al. | |
| 2015/0261876 A1 | 9/2015 | Trikha et al. | |
| 2015/0347542 A1 | 12/2015 | Sullivan et al. | |
| 2016/0007138 A1 | 1/2016 | Palanisamy et al. | |
| 2016/0092176 A1 | 3/2016 | Straub et al. | |
| 2016/0092180 A1 | 3/2016 | Straub | |
| 2016/0092348 A1 | 3/2016 | Straub et al. | |
| 2016/0094398 A1 | 3/2016 | Choudhury et al. | |
| 2016/0098265 A1 | 4/2016 | Mahajan et al. | |
| 2016/0112268 A1 | 4/2016 | Chung et al. | |
| 2016/0156614 A1 | 6/2016 | Jain et al. | |
| 2016/0197830 A1 | 7/2016 | Ulevitch et al. | |
| 2016/0202964 A1 | 7/2016 | Butcher et al. | |
| 2016/0216959 A1 | 7/2016 | Kurian et al. | |
| 2016/0234071 A1 | 8/2016 | Nambiar et al. | |
| 2016/0315848 A1 | 10/2016 | Weinstein | |
| 2016/0315912 A1 | 10/2016 | Mayya et al. | |
| 2016/0323161 A1 | 11/2016 | Cuervo Laffaye et al. | |
| 2016/0323361 A1 | 11/2016 | Austel et al. | |
| 2016/0337104 A1 | 11/2016 | Kalligudd | |
| 2016/0337175 A1 | 11/2016 | Rao | |
| 2016/0342906 A1 | 11/2016 | Shaashua et al. | |
| 2016/0344745 A1 | 11/2016 | Johnson et al. | |
| 2016/0345516 A1 | 12/2016 | Britt et al. | |
| 2016/0357525 A1 | 12/2016 | Wee et al. | |
| 2017/0005820 A1 | 1/2017 | Zimmerman et al. | |
| 2017/0006135 A1* | 1/2017 | Siebel ..................... | G06Q 10/06 |
| 2017/0048079 A1* | 2/2017 | Nethi ..................... | H04L 12/2836 |
| 2017/0060574 A1 | 3/2017 | Malladi et al. | |
| 2017/0097950 A1 | 4/2017 | Meacham et al. | |
| 2017/0099176 A1 | 4/2017 | Jain | |
| 2017/0102931 A1 | 4/2017 | Risbood et al. | |
| 2017/0123939 A1 | 5/2017 | Maheshwari et al. | |
| 2017/0126809 A1 | 5/2017 | Chen et al. | |
| 2017/0142068 A1 | 5/2017 | Devarajan et al. | |
| 2017/0149931 A1 | 5/2017 | Lochhead et al. | |
| 2017/0168813 A1* | 6/2017 | Pogrebinsky ............ | G06F 8/60 |
| 2017/0171607 A1 | 6/2017 | Britt | |
| 2017/0177334 A1 | 6/2017 | Chou et al. | |

(56) References Cited

U.S. PATENT DOCUMENTS

| | | |
|---|---|---|
| 2017/0177877 A1 | 6/2017 | Suarez et al. |
| 2017/0180272 A1 | 6/2017 | Bernath |
| 2017/0180346 A1 | 6/2017 | Suarez et al. |
| 2017/0185507 A1 | 6/2017 | Eberlein |
| 2017/0185922 A1 | 6/2017 | Lange et al. |
| 2017/0187807 A1 | 6/2017 | Clernon |
| 2017/0201411 A1 | 7/2017 | Mladin et al. |
| 2017/0201585 A1 | 7/2017 | Doraiswamy et al. |
| 2017/0212718 A1 | 7/2017 | Nelson et al. |
| 2017/0213157 A1 | 7/2017 | Bugay et al. |
| 2017/0244600 A1 | 8/2017 | Hussein et al. |
| 2017/0257432 A1 | 9/2017 | Fu et al. |
| 2017/0289173 A1 | 10/2017 | Resch et al. |
| 2017/0315820 A1 | 11/2017 | Entezari et al. |
| 2017/0347264 A1 | 11/2017 | Holland et al. |
| 2018/0007055 A1 | 1/2018 | Infante-lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1* | 4/2018 | Mahindru ........... G06F 11/3089 |
| 2018/0109395 A1 | 4/2018 | Berdy et al. |
| 2018/0109650 A1 | 4/2018 | Berdy et al. |
| 2018/0109929 A1 | 4/2018 | Ly et al. |
| 2018/0123820 A1 | 5/2018 | Kim |
| 2018/0159745 A1 | 6/2018 | Byers et al. |
| 2018/0167392 A1 | 6/2018 | Zakaria |
| 2018/0212970 A1 | 7/2018 | Chen et al. |
| 2018/0219877 A1 | 8/2018 | Hsu et al. |
| 2018/0234351 A1 | 8/2018 | Amento et al. |
| 2018/0293463 A1 | 10/2018 | Brown |
| 2018/0295194 A1 | 10/2018 | Deraz et al. |
| 2018/0300124 A1 | 10/2018 | Malladi et al. |
| 2018/0302266 A1 | 10/2018 | Makovsky et al. |
| 2018/0307464 A1 | 10/2018 | Bijani et al. |
| 2018/0307537 A1 | 10/2018 | Chen et al. |
| 2018/0309819 A1 | 10/2018 | Thompson |
| 2018/0314808 A1 | 11/2018 | Casey et al. |
| 2018/0324204 A1 | 11/2018 | Mcclory. et al. |
| 2018/0332116 A1 | 11/2018 | George et al. |
| 2018/0338242 A1 | 11/2018 | Li et al. |
| 2018/0373419 A1 | 12/2018 | Chen et al. |
| 2018/0373555 A1 | 12/2018 | Gupta et al. |
| 2019/0014048 A1 | 1/2019 | Krishna Singuru |
| 2019/0018951 A1 | 1/2019 | James et al. |
| 2019/0026082 A1 | 1/2019 | Shalev et al. |
| 2019/0034837 A1 | 1/2019 | Lou et al. |
| 2019/0041824 A1 | 2/2019 | Chavez et al. |
| 2019/0045033 A1 | 2/2019 | Agerstam et al. |
| 2019/0068445 A1 | 2/2019 | Chauhan et al. |
| 2019/0087220 A1 | 3/2019 | Turner |
| 2019/0098113 A1 | 3/2019 | Park et al. |
| 2019/0109816 A1 | 4/2019 | Liu et al. |
| 2019/0114211 A1 | 4/2019 | Reddipalli et al. |
| 2019/0121889 A1 | 4/2019 | Gold et al. |
| 2019/0123959 A1 | 4/2019 | Joshi et al. |
| 2019/0141022 A1 | 5/2019 | Reeve et al. |
| 2019/0146773 A1 | 5/2019 | Attard |
| 2019/0158353 A1 | 5/2019 | Johnson et al. |
| 2019/0158600 A1 | 5/2019 | Cook |
| 2019/0182333 A1 | 6/2019 | Bartfai-Walcott et al. |
| 2019/0188742 A1* | 6/2019 | Vasudevan ......... G06Q 30/0202 |
| 2019/0190776 A1 | 6/2019 | Bregman et al. |
| 2019/0213273 A1* | 7/2019 | Vasudevan ............. G06F 18/41 |
| 2019/0243836 A1 | 8/2019 | Nanda et al. |
| 2019/0251166 A1* | 8/2019 | Penrose .............. G06F 16/3329 |
| 2019/0286353 A1* | 9/2019 | Soni .................... G06F 9/45558 |
| 2019/0295012 A1* | 9/2019 | Marinescu ............. G06N 20/00 |
| 2019/0319919 A1 | 10/2019 | Knecht et al. |
| 2019/0320038 A1 | 10/2019 | Walsh et al. |
| 2019/0342182 A1 | 11/2019 | Dhanabalan et al. |
| 2019/0384641 A1 | 12/2019 | Zhao et al. |
| 2020/0014607 A1* | 1/2020 | Gangadhar ............. H04L 41/16 |
| 2020/0014633 A1 | 1/2020 | You et al. |
| 2020/0034776 A1* | 1/2020 | Peran ...................... G06N 5/022 |
| 2020/0073739 A1 | 3/2020 | Rungta et al. |
| 2020/0092789 A1 | 3/2020 | Lee et al. |
| 2020/0097274 A1 | 3/2020 | Sarkar et al. |
| 2020/0104723 A1 | 4/2020 | Reissner et al. |
| 2020/0112487 A1 | 4/2020 | Inamdar et al. |
| 2020/0122038 A1 | 4/2020 | Ebrahimi et al. |
| 2020/0126129 A1 | 4/2020 | Lkhamsuren |
| 2020/0127832 A1 | 4/2020 | Ebrahimi |
| 2020/0177503 A1 | 6/2020 | Hooda et al. |
| 2020/0177630 A1 | 6/2020 | Penner et al. |
| 2020/0192690 A1 | 6/2020 | Gupta et al. |
| 2020/0218580 A1 | 7/2020 | Kim |
| 2020/0250002 A1 | 8/2020 | Gururaj et al. |
| 2020/0258627 A1 | 8/2020 | Setegn et al. |
| 2020/0274776 A1 | 8/2020 | Nishikawa |
| 2020/0287737 A1 | 9/2020 | Mishra et al. |
| 2020/0336467 A1 | 10/2020 | Subbarayan et al. |
| 2020/0356415 A1 | 11/2020 | Goli |
| 2021/0004270 A1 | 1/2021 | Singh et al. |
| 2021/0005330 A1 | 1/2021 | Patil et al. |
| 2021/0006636 A1 | 1/2021 | Koehler et al. |
| 2021/0042104 A1 | 2/2021 | Tashkandi |
| 2021/0042160 A1 | 2/2021 | Alamouti et al. |
| 2021/0044579 A1 | 2/2021 | Nelson-Gal et al. |
| 2021/0058338 A1 | 2/2021 | Liu |
| 2021/0067607 A1 | 3/2021 | Gardner et al. |
| 2021/0084670 A1 | 3/2021 | Chauhan et al. |
| 2021/0089408 A1 | 3/2021 | Park et al. |
| 2021/0112059 A1 | 4/2021 | Heldman et al. |
| 2021/0112128 A1 | 4/2021 | Joshi et al. |
| 2021/0140815 A1 | 5/2021 | Pretorius et al. |
| 2021/0160338 A1 | 5/2021 | Koehler et al. |
| 2021/0232344 A1 | 7/2021 | Corrie |
| 2021/0255846 A1 | 8/2021 | Mamgain et al. |
| 2021/0271565 A1 | 9/2021 | Bhavanarushi et al. |
| 2021/0311764 A1 | 10/2021 | Rosoff et al. |
| 2021/0342193 A1 | 11/2021 | Anand |
| 2021/0373965 A1 | 12/2021 | Hadas et al. |
| 2021/0400043 A1 | 12/2021 | Su et al. |
| 2022/0083018 A1* | 3/2022 | Majeed ................ G05B 19/056 |
| 2022/0083389 A1 | 3/2022 | Poothia et al. |
| 2022/0121543 A1 | 4/2022 | Poothia et al. |
| 2022/0138070 A1 | 5/2022 | Mokashi et al. |
| 2022/0147336 A1 | 5/2022 | Joshi et al. |
| 2022/0159093 A1 | 5/2022 | Joshi et al. |
| 2022/0279046 A1 | 9/2022 | Perng et al. |
| 2022/0334882 A1 | 10/2022 | Wang |
| 2023/0070811 A1 | 3/2023 | Patil et al. |
| 2023/0141808 A1 | 5/2023 | Joshi et al. |
| 2023/0289225 A1 | 9/2023 | Singh et al. |

OTHER PUBLICATIONS

U.S. Appl. No. 16/666,242, titled "Scalable Centralized Internet-Ofthings Manager", dated Oct. 28, 2019.
U.S. Appl. No. 16/920,235, titled "Apparatus and Method for Deploying a Mobile Device as a Data Source in an IoT System", dated Jul. 2, 2020.
Khaddar, Ajana El M. et al., "Smartphone: the Ultimate IoT and IoE Device", IntechOpen, "Smartphones from an Applied Research Perspective", pp. 137-162 (Ch. 7), Nov. 2, 2017, http://dx.doi.org/10.5772/intechopen.69734.
Mahajan, Kshiteej et al., "Themis: Fair and Efficient GPU Cluster Scheduling", Cornell University, ARXIV:1907.01484 [CS.DC], Published Oct. 29, 2019, 15 pages.
Mijumbi, Rashid et al., "Learning Algorithms for Dynamic Resource Allocation in Virtualised Networks", Universitat Politecnica de Catalunya, 08034 Barcelona, Spain, Publication date unknown, 4 pages.
Sun, Peng et al., "Towards Distributed Machine Learning in Shared Clusters: a Dynamically-Partitioned Approach", Cornell University: ARXIV: 1704.06738V1 [CS.CD], Published Apr. 22, 2017, 6 pages.
U.S. Appl. No. 17/376,581 titled "Common Services Model for Multi-Cloud Platform" filed Jul. 15, 2021.

(56) References Cited

OTHER PUBLICATIONS

Extended European Search Report for EP Application No. 20201164.9, dated Feb. 11, 2021, pp. all.
Beguelin, Daniel "Turn Your Smartphone Into an IoT Device", IBM Developer https://developer.ibm.com/tutorials/iot-mobile-phone-iot-device-bluemix-apps-trs/, Nov. 10, 2015, pp. 1-12.
Poitras, Steven. "The Nutanix Bible" (Oct. 15, 2013), from http://stevenpoitras.com/the-nutanix-bible/ (Publication date based on indicated capture date by Archive.org; first publication date unknown); pp. all.
Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/; pp. all.
Poitras, Steven. "The Nutanix Bible" (Jan. 12, 2016), from https://nutanixbible.com/ ; pp. all.
Poitras, Steven. "The Nutanix Bible" (Jun. 9, 2016), from https://nutanixbible.com/; pp. all.
Poitras, Steven. "The Nutanix Bible" (Jan. 3, 2017), from https://nutanixbible.com/; pp. all.
Poitras, Steven. "The Nutanix Bible" (Jun. 8, 2017), from https://nutanixbible.com/; pp. all.
Poitras, Steven. "The Nutanix Bible" (Jan. 3, 2018), from https://nutanixbible.com/; pp. all.
Poitras, Steven. "The Nutanix Bible" (Jun. 25, 2018), from https://nutanixbible.com/; pp. all.
Poitras, Steven. "The Nutanix Bible" (Jan. 8, 2019), from https://nutanixbible.com/; pp. all.
Poitras, Steven. "The Nutanix Bible" (Jul. 25, 2019), from https://nutanixbible.com/; pp. all.
Poitras, Steven. "The Nutanix Bible" (Sep. 17, 2019), from https://nutanixbible.com/; pp. all.
Cano, Ignacio et al. "Curator: Self-Managing Storage for Enterprise Clusters"; University of Washington; published Mar. 2017; pp. all.
Poitras, Steven. "The Nutanix Bible" (Mar. 2, 2020), from https://nutanixbible.com/; pp. all.
U.S. Appl. No. 17/139,325 titled "Key Value Store in a Clustered Containerized System" filed Dec. 31, 2020, pp. all.
U.S. Appl. No. 17/148,231 titled "Upgrade Systems for Service Domains" filed Jan. 13, 2021, pp. all.
U.S. Appl. No. 17/187,220 titled "Generic Proxy Endpoints Using Protocol Tunnels Including Life Cycle Management and Examples for Distributed Cloud Native Services and Applications" filed Feb. 26, 2021, pp. all.
U.S. Appl. No. 17/302,189 titled "User Interface and Health Status Monitoring for a Multi Service Domainsystem" filed Apr. 27, 2021, pp. all.
U.S. Appl. No. 17/350,636 titled "AI Inference Hardware Resource Scheduling" filed Jun. 17, 2021, pp. all.
"BtrPlace: An Open-Source Flexible Virtual Machine Scheduler", University Nice Sophia Antipolis, pp. 1-8.
"Multi-Process Service", Nvidia, vR450, https://docs.nvidia.com/deploy/pdf/CUDA_Multi_Process_Service_Overview.pdf Jun. 2020, pp. 1-28.
"TensorFlow Serving", GitHub, https://github.com/tensorflow/serving pp. 1-4.
Abadi, Martin et al. "TensorFlow: Large-Scale Machine Learning on Heterogeneous Distributed Systems", Preliminary White Paper, http://download.tensorflow.org/paper/whitepaper2015.pdf Nov. 9, 2015, pp. 1-19.
Goldsborough, Peter et al. "A Tour of TensorFlow: Proseminar Data Mining", Technische Universität München, https://arxiv.org/pdf/1610.01178.pdf Oct. 2016, pp. 1-16.
Grammatikou, Mary et al. "GEMBus as a Service Oriented Platform for Cloud-Based Composable Services", 2011 IEEE Third International Conference on Cloud Computing Technology and Science, Nov. 1, 2011, pp. 666-671.
Hermann, Jeremy et al. "Meet Michelangelo: Uber's Machine Learning Platform", Uber Engineering, https://eng.uber.com/michelangelo-machine-learning-platform/ Sep. 5, 2017, pp. 1-17.
Hoare, Suchismita et al."A Semantic-Agent Framework for PaaS Interoperability", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.
Jain, Paras et al. "Dynamic Space-Time Scheduling for GPU Inference", Massachusetts Institute of Technology, University of California, Berkeley; http://learningsys.org/nips18/assets/papers/102CameraReadySubmissionGPU_Virtualization%20(8).pdf 32nd Conference on Neural Information Processing Systems Dec. 31, 2018, pp. 1-8.
Lacoste, M. et al. "User-Centric Security And Dependability In The Clouds-of-Clouds", IEEE Cloud Computing, Sep. 2016, 64-75.
Li, Li E. et al. "Scaling Machine Learning as a Service", Uber Technologies, Inc., JMLR: Workshop and Conference Proceeding, http://proceedings.mlr.press/v67/li17a/li17a.pdf 2016, pp. 16-29.
Rafique, Ansar et al. "Towards Portability and Interoperability Support in Middleware for Hybrid Clouds", 2014 IEEE INFOCOM Workshop on Cross-Cloud Systems, Apr. 27, 2014, pp. 7-12.
Warburton, Tim "An Intro to GPU Architecture and Programming Models I Tim Warburton, Virginia Tech", YouTube, Argonne National Laboratory Training, https://www.youtube.com/watch?v=IGmpv8xpT4E Sep. 25, 2017, pp. 1-3.
"From Pilot to Production: Secure Workspace IoT Endpoint Management at Scale", VMWare, Inc. https://www.vmware.com/products/workspace-one/workspace-iot.html, pp. 1-3.
Stoks, Jessie , "Workspace IoT Series: How Industry 4.0 Will Transform Your Mobile Strategy", VMware End-User Computing Blog https://blogs.vmware.com/euc/2019/02/workspace-iot-mobile-strategy.html, Feb. 20, 2019, pp. 1-5.
"Anthos", Google Cloud https://cloud.google.com/anthos, Apr. 21, 2020, pp. 1-26.
"Architecting For The Cloud: AWS Best Practice", Amazon Web Services https://d1.awsstatic.com/whitepapers/AWS_Cloud_Best_Practices.pdf, Oct. 2018, pp. 1-50.
"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, pp. 1-2.
"Best Practices for Cloud Management", Service Now https://www.servicenow.com/content/dam/servicenow-assets/public/en-us/doc-type/resource-center/solution-brief/sb-cloud-management.pdf, Jun. 2017, pp. 1-2.
"Comprehensive Guide on Upgrading PKS", PKS 1.3, Apr. 2019, pp. 1-45.
"How to adopt a multi-cluster strategy for your applications in Anthos", YouTube | Google Cloud Tech https://www.youtube.com/watch?v=ZhF-rTXq-Us&list=PLlivdWyY5sqKN73vzKpg2p2JmOGoAN0CG&index=6, May 29, 2020, pp. 1.
"How to get started with Anthos on Google Cloud", YouTube | Google Cloud Tech https://www.youtube.com/watch?v=ghFiaz7juoA&list=PLlivdWyY5sqKN73vzKpg2p2JmOGoAN0CG&index=4, Apr. 30, 2020, pp. 1.
"How to Troubleshoot PKS Upgrade Issues", VMware Tanzu Supprt Hub https://community.pivotal.io/s/article/how-to-troubleshoot-pks-upgrade-issues?language=en_US, Jul. 17, 2019, pp. 1-11.

(56) References Cited

OTHER PUBLICATIONS

"IBM Edge Application Manager", IBM https://www.ibm.com/cloud/edge-application-manager, May 5, 2020.
"Installation and Update OpenShift Container Platform Installation Overview", https://docs.openshift.com/container-platform/4.5/architecture/architecture-installation.html retrieved May 24 relevant to OpenShift Container Platform 4.5 general availability Jul. 13, 2020, pp. 1-17.
"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Migrating Kubernetes apps to Serverless with Cloud Run on Anthos", YouTube | Google Cloud Tech https://www.youtube.com/watch?v=0T5UliS9j8A, Nov. 19, 2019.
"mPRM: An Overview", ProSyst http://documentation.bosch-si.com/iot/PRM/v6.0/welcome/mprm_functional.html, Jun. 13, 2017, pp. 1-3.
"Multicloud Application Patterns", VMWare Docs https://docs.vmware.com/en/VMware-Tanzu-Service-Mesh/services/concepts-guide/GUID-4123C2ED-EC61-4CDA-A38D-2A7454BDDA46.html, Jul. 7, 2020, pp. 1-2.
"New Technology Projection: The Total Economic Impact Of Anthos", A Forrester Total Economic Impact https://services.google.com/fh/files/misc/the_total_economic_impact_of_anthos.pdf?mkt_tok=ODA4LUdKVy0zMTQAAAGEowKcUaDaTyTRyP0murezYOwrjB4GihzmPwbs7d0qMaMhJZtax3Of12Gx2-HRDm4SifQME2gL7297yUgZ3FEMxg5UdUp3eFaN5j_Oie7D0ta28s, Nov. 2019, pp. 1-26.
"OpenShift Container Platform Architecture", https://docs.openshift.com/container-platform/4.5/architecture/architecture.html retrieved May 24, 2022 relevant to OpenShift Container Platform 4.5 general availability Jul. 13, 2020, pp. 1-10.
"OpenShift Container Platform Architecture", https://docs.openshift.com/container-platform/4.1/architecture/architecture.html retrieved May 27, 2022 relevant to OpenShift Container Platform 4.1 general availability Jun. 4, 2019, pp. 1-11.
"OpenShift Container Platform cluster monitoring, logging, and Telemetry", RedHat https://access.redhat.com/documentation/en-us/openshift_container_platform/4.2/html/container-native_virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27 relevant to OpenShift Container Platform 4.1 general availability Jun. 4, 2019, pp. 1-13.
"Overview: OpenShift Container Platform", https://docs.openshift.com/container-platform/3.9/getting_started/index.html retrieved May 24 relevant to OpenShift Container Platform 3.9 general availability Oct. 2018, pp. 1-2.
"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, pp. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Pivotal Container Service (PKS)", Pivotal Version 1.2 https://resources.docs.pivotal.io/pdfs/pks-1-2.pdf, Sep. 3, 2019, pp. 1-323.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Red Hat Enterprise Linux CoreOS (RHCOS)", https://docs.openshift.com/container-platform/4.5/architecture/architecture-rhcos.html retrieved May 24, 2022 relevant to OpenShift Container Platform 4.5 general availability Jul. 13, 2020, pp. 1-19.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.
"Setting up ServiceNow Cloud Management", DxSherpa https://dxsherpa.com/blogs/setting-up-servicenow-cloud-management/, Jul. 19, 2018, pp. 1-10.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.5/architecture/understanding-development.html retrieved May 24, 2022 relevant to OpenShift Container Platform 4.5 general availability Jul. 13, 2020, pp. 1-17.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"Video—Intro to IBM Edge Application Manager", IBM https://www.ibm.com/cloud/blog/intro-to-ibm-edge-application-manager, May 13, 2020, pp. 1-16.
"VMware Announces VMware Tanzu Portfolio to Transform the Way Enterprises Build, Run and Manage Software on Kubernetes", VMware News & Stories https://news.vmware.com/releases/vmware-announces-vmware-tanzu-portfolio-to-transform-the-way-enterprises-build-run-and-manage-software-on-kubernetes, Aug. 26, 2019, pp. 1-11.
"VMware Enterprise PKS Architecture Overview", YouTube https://www.youtube.com/watch?v=504FGHukY8Y, Feb. 9, 2018, pp. 1.
"VMware Tanzu Mission Control Demo", YouTube https://www.youtube.com/watch?v=7m9S4HilJlo, Aug. 28, 2019, pp. 1.
"Welcome to Azure Arc", YouTube, Microsoft Azure https://www.youtube.com/watch?v=3zdJJ97pNT4, Feb. 19, 2020, pp. 1.
"What is Anthos Service Mesh?", Google Cloud | Anthos Service Mesh 1.4 https://cloud.google.com/service-mesh/v1.4/docs/overview, Dec. 20, 2019, pp. 1-4.
"What is Anthos?", YouTube, Google Cloud Tech https://www.youtube.com/watch?v=Qtwt7QcW4J8, Apr. 21, 2020, pp. 1.
Balkan, Ahmet Alp, "What's new in Cloud Run for Anthos", Google Cloud https://cloud.google.com/blog/products/serverless/new-features-in-cloud-run-for-anthos-ga, Dec. 11, 2019, pp. 1-7.
Banka, Roank , "Pivotal CloudFoundry on Google cloud platform", Slideshare https://www.slideshare.net/Pivotal/pivotal-container-service-overview, Jul. 16, 2018, pp. 1-44.
Ben-David, Jacob , "Google Cloud's Anthos—Everything You Need To Know", Turbonomic Blog https://blog.turbonomic.com/google-clouds-anthos, Apr. 15, 2019, pp. 1-9.
Carey, Scott , "The major hybrid cloud options compared: AWS Outposts vs Azure Stack vs Google Anthos", ComputerWorld https://www.computerworld.com/article/3428108/the-major-hybrid-

(56) References Cited

OTHER PUBLICATIONS cloud-options-compared-aws-outposts-vs-azure-stack-vs-google-anthos.html, Nov. 6, 2019, pp. 1-9.
Goodison, Donna , "Google Cloud Unleashes Managed Service Mesh, Serverless For Anthos", The Channel Co. CRN https://www.crn.com/news/cloud/google-cloud-unleashes-managed-service-mesh-serverless-for-anthos, Sep. 16, 2019, pp. 1-6.
"Architecting VMware Unified Access Gateway", https://www.youtube.com/watch?v=URSdJ9qCQKo&t=234s, Apr. 17, 2019, pp. 1.
"AWS Architecture Monthly—Internet of Things Jun. 2019", AWS | https://d1.awsstatic.com/whitepapers/architecture-monthly/AWS-Architecture-Monthly-Jun. 2019.pdf, Jun. 2019.
"AWS IoT Greengrass", https://web.archive.org/web/20190624094650/https://aws.amazon.com/greengrass/, Jun. 2019, pp. 1-13.
"AWS IoT vs. Google IoT vs. Azure IoT", Bizety | https://www.bizety.com/2018/08/28/aws-iot-vs-google-iot-vs-azure-ot/, Aug. 28, 2018, pp. 1-7.
"Azure IoT Central intro walkthrough", https://www.youtube.com/watch?v=G32stXSwtyA&ab_channel=MicrosoftDeveloper, Feb. 2018.
"Cloud IoT Core", https://web.archive.org/web/20190129000453/https://cloud.google.com/iot-core/, Jan. 2019, pp. 1-10.
"Cloud IoT Core—Devices, configuration, and state", Google | https://web.archive.org/web/20190330153113/https://cloud.google.com/iot/docs/concepts/devices, Mar. 2019.
"Cloud IoT Core Private Beta", Google | https://web.archive.org/web/20170518022234/https://cloud.google.com/iot-core/, May 2017.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-us/blog/extended-offline-operation-with-azure-iot-edge/, Sep. 2018.
"Google Cloud IoT Core", Google | https://www.slideshare.net/idof/google-cloud-iot-core, Sep. 2018.
"Introducing Google Cloud IoT Core: forsecurely connecting and managing IoTdevices at scale", Google Cloud | https://cloud.google.com/blog/products/gcp/introducing-google-cloud-iot-core-for-securely-connecting-and-managing-iot-devices-at-scale, May 2017.
"IoT Core device-to-device communication", Google |https://cloud.google.com/community/tutorials/iot-device-to-device, Dec. 2017.
"IoT Partner Quickstart", https://services.google.com/fh/files/misc/iot_partner_quickstart1.0.pdf, Nov. 15, 2018, pp. 1-13.
"Meeting at the Edge with VMware Internet of Things (IoT)", https://blogs.vmware.com/edge/files/2017/04/Meeting-at-the-Edge.pdf, Apr. 2017, pp. 1-9.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.
"Mobile Content Management", VMWare | https://www.vmware.com/content/dam/digitalmarketing/vmware/en/pdf/workspace-one/vmware-airwatch-mcm-datasheet.pdf, Dec. 2019, pp. 1-4.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"What is AWS IoT?", AWS | Youtube: https://www.youtube.com/watch?v=WAp6FHbhYCk&ab_channel=AmazonWebServices; Timestamp 4:55/10:08, Jan. 2018.
"What is IoT Edge?", Code Project | https://www.codeproject.com/Articles/1261285/What-is-IoT-Edge, Sep. 2018, pp. 1-9.
Avram, Abel , "AWS Greengrass Runs Lambda Functions on IoT Devices", InfoQ | https://www.infoq.com/news/2017/06/aws-greengrass/, Jun. 8, 2017, pp. 1-2.
Chi, Chrissie , "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.
Lobo, Savia , "Microsoft Azure IoT Edge is open source and generally available!", PacktHub | https://hub.packtpub.com/microsoft-azure-iot-edge-is-open-source-and-generally-available/, Jun. 29, 2018, pp. 1-2.
Msv, Janakiram , "5 Reasons Why Azure IoT Edge Is Industry's Most Promising Edge Computing Platform", Forbes https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.
Msv, Janakiram , "Azure IoT Edge: A Technology Primer", TheNewStack | https://thenewstack.io/azure-iot-edge-a-technology-primer/, Sep. 14, 2018, pp. 1-9.
Oleniczak, Kevin , "Using AWS IoT for Predictive Maintenance", AWS | https://aws.amazon.com/blogs/iot/using-aws-iot-for-predictive-maintenance/, Jun. 28, 2018, pp. 1-6.
Param, Sunil , "Google's Coral: A new product development platform with local AI", TechGig | https://content.techgig.com/technology/googles-coral-a-new-product-development-platform-with-local-ai/articleshow/69042955.cms, Apr. 26, 2019, pp. 1-18.
Rhee, Injong , "Bringing intelligence to the edge with Cloud IoT", Google Cloud | https://cloud.google.com/blog/products/gcp/bringing-intelligence-edge-cloud-iot, Jul. 25, 2018, pp. 1-7.
Vanderzyden, John , "Using AWS Greengrass to Enable IoT Edge Computing", mabl | https://www.mabl.com/blog/using-aws-greengrass-enable-iot-edge-computing, Aug. 23, 2017, pp. 1-12.
Wiggers, Kyle , "Microsoft launches Azure IoT Edge out of preview", VentureBeat | https://venturebeat.com/mobile/microsoft-launches-azure-iot-edge-out-of-preview/, Jun. 27, 2018, pp. 1-6.
Yamashita, Teppei , "Real-time data processing with IoT Core", Google Cloud | https://cloud.google.com/community/tutorials/cloud-iot-rtdp, Apr. 2018, pp. 1-19.
Zhang, Xinyi , "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.
U.S. Appl. No. 18/047,623 titled "Common Services Model for Multi-Cloud Platform" filed Oct. 18, 2022.
"VMware Workspace ONE Access: Feature Walk-through", YouTube | https://www.youtube.com/watch?=LGQRUe2vKWs, Feb. 19, 2020, pp. 1.
Benson, Mark , "Technical Introduction to VMware Unified Access Gateway for Horizon Secure Remote Access", VMWare | https://blogs.vmware.com/euc/2015/09/what-is-vmware-unified-access-gateway-secure-remote-access.html. Sep. 9, 2015, pp. 8.
Foley, Mike , "vSphere 7—Introduction to the vSphere Pod Service", VMWare | https://blogs.vmware.com/vsphere/2020/04/vsphere-7-vsphere-pod-service.html, Apr. 9, 2020, pp. 8.
Hagoort, Niels , "vSphere 7—A Closer Look at the VM DRS Score", VMWare | https://blogs.vmware.com/vsphere/2020/05/vsphere-7-a-closer-look-at-the-vm-drs-score.html, May 21, 2020, pp. 8.
Hagoort, Niels , "vSphere 7—Assignable Hardware", VMWare | https://blogs.vmware.com/vsphere/2020/03/vsphere-7-assignable-hardware.html, Mar. 31, 2020, pp. 7.
Hagoort, Niels , "vSphere 7—Improved DRS", VMWare | https://blogs.vmware.com/vsphere/2020/03/vsphere-7-improved-drs.html, Mar. 25, 2020, pp. 8.
Iyengar, Ashok , "Analytics at the Edge", https://www.ibm.com/cloud/blog/analytics-at-the-edge, Jun. 8, 2020, pp. 1-13.
Iyengar, Ashok , "Architecting at the Edge", https://www.ibm.com/cloud/blog/architecting-at-the-edge, Oct. 21, 2019, pp. 1-14.
Iyengar, Ashok , et al., "Architectural Decisions at the Edge", https://www.ibm.com/cloud/blog/architectural-decisions-at-the-edge, Jul. 26, 2019, pp. 1-16.
Iyengar, Ashok , et al., "Automation at the Edge", https://www.ibm.com/cloud/blog/automation-at-the-edge, Feb. 18, 2017, pp. 1-13.
Iyengar, Ashok , "Cloud at the Edge", https://www.ibm.com/cloud/blog/cloud-at-the-edge, Feb. 26, 2019, pp. 1-9.

(56) References Cited

OTHER PUBLICATIONS

Iyengar, Ashok, "DevOps at the Edge", https://www.ibm.com/cloud/blog/devops-at-the-edge, Dec. 3, 2015, pp. 1-13.
Iyengar, Ashok, "GitOps at the Edge", https://www.ibm.com/cloud/blog/gitops-at-the-edge, Nov. 2, 2017, pp. 1-13.
Iyengar, Ashok, et al., "Models Deployed at the Edge", https://www.ibm.com/cloud/blog/models-deployed-at-the-edge, Mar. 30, 2020, pp. 1-17.
Iyengar, Ashok, "Policies at the Edge", https://www.ibm.com/cloud/blog/policies-at-the-edge, Jan. 22, 2020, pp. 1-13.
Iyengar, Ashok, et al., "Rounding Out the Edges", https://www.ibm.com/cloud/blog/rounding-out-the-edges, May 7, 2019, pp. 1-11.
Iyengar, Ashok, "Security at the Edge", https://www.ibm.com/cloud/blog/security-at-the-edge, May 12, 2020, pp. 1-17.
Lee, Brandon, "What is VMware vSphere 7 Assignable Hardware?", https://www.virtualizationhowto.com/2020/06/what-is-vmware-vsphere-7-assignable-hardware/, Jun. 25, 2020, pp. 8.
McConville, Anton, et al., "A brief history of Kubernetes, OpenShift, and IBM", IBM Developer Blog | https://developer.ibm.com/blogs/a-brief-history-of-red-hat-openshift/, Aug. 1, 2019, pp. 9.
Menezes, Alexandre, "Introduction to Security Contexts and SCCs", Red Hat | https://cloud.redhat.com/blog/introduction-to-security-contexts-and-sccs, Mar. 16, 2020, pp. 7.
Paladi, Nicolae, et al., "Domain Based Storage Protection with Secure Access Control for the Cloud", https://dl.acm.org/doi/pdf/10.1145/2600075.2600082, 2014, pp. 35-42.
Rosoff, Jared, "Project Pacific—Technical Overview", VMware | https://blogs.vmware.com/vsphere/2019/08/project-pacific-technical-overview.html, Aug. 26, 2019, pp. 7.
Tamura, Yoshi, "GPUs as a service with Kubernetes Engine are now generally available", Google Cloud | https://cloud.google.com/blog/products/gcp/gpus-service-kubernetes-engine-are-now-generally-available, Jun. 19, 2018, pp. 5.
Wiggers, Steef-Jan, "Google Kubernetes Engine 1.10 Is Generally Available and Enterprise Ready", InfoQ | https://www.infoq.com/news/2018/06/google-kubernetes-engine-1.10-ga, Jun. 1, 2018, pp. 4.
U.S. Appl. No. 17/932,235 titled "Apparatus and Method for Depoying a Mobile Device as a Data Source in an IoT System" filed Sep. 14, 2022.
"Comprehensive Guide on Upgrading PKS", PKS 1.3 https://kb.vmware.com/sfc/servlet.shepherd/version/download/068f4000009EfWPAA0, Apr. 2019, pp. 1-45.
"Extract, Transform, Load with AWS IoT Greengrass Solution Accelerator", AWS | https://aws.amazon.com/iot/solutions/etl-accelerator/, Oct. 2019, pp. 1-6.
"Pivotal Container Service Overview", Slideshare https://www.slideshare.net/Pivotal/pivotal-container-service-overview, Jul. 16, 2019, pp. 1-78.
U.S. Appl. No. 18/185,300 titled "Scalable Centralized Manager Including Examples of Data Pipeline Deployment to an Edge System" filed Mar. 26, 2023.
U.S. Appl. No. 18/321,678 titled "Generic Proxy Endpoints Using Protocol Tunnels Including Life Cyclemanagement and Examples for Distributed Cloud Native Services Andapplications" filed May 22, 2023.
Angelas, "Java Heap Space vs. Stack Memory: How Java Applications Allocate Memory", stackify.com, Sep. 5, 2017, pp. 1-3.
Harnik, Danny, et al., "Secure Access Mechanism for Cloud Storage", vol. 12, No. 3, pp. 317-336. [Retrieved from internet on Feb. 14, 2023], <https://scpe.org/index.php/scpe/article/view/727>, 2011, pp. 317-336.
Zhao, Zhuoran, et al., "DeepThings: Distributed Adaptive Deep Learning Inference on Resource-Constrained IoT Edge Clusters", IEEE Transactions on Computer-Aided Design of Integrated Circuits and Systems, vol. 37, No. 11 | doi: 10.1109/TCAD.2018.2858384., Nov. 2018, pp. 2348-2359.
"Cloud, Fog and Edge Computing—What's the Difference?", https://www.winsystems.com/cloud-fog-and-edge-computing-whats-the-difference/, Dec. 4, 2017, pp. 1-10.
"IoT: Understanding the shift from cloud to edge computing", https://internetofbusiness.com/shift-from-cloud-to-edge-computing/, Aug. 14, 2018, pp. 1-9.
Ai, Yuan, et al., "Edge computing technologies for Internet of Things: a primer", Digital Communications and Networks 4 | https://doi.org/10.1016/j.dcan.2017.07.001, 2018, pp. 77-86.
O'Keefe, Megan, "Edge Computing and the Cloud-Native Ecosystem", TheNewStack | https://thenewstack.io/edge-computing-and-the-cloud-native-ecosystem/, Apr. 18, 2018, pp. 1-11.
Ren, Ju, et al., "Edge Computing for the Internet of Things", IEEE Journals & Magazine | vol. 32 Issue: 1, 2008, pp. 1-6.
Beltre, Angel, et al., "Enabling HPC workloads on Cloud Infrastructure using Kubernetes Container Orchestration Mechanisms", 2019 IEEE/ACM Workshop on Containers and New Orchestration Paradigms for Isolated Environments in HPC (CANOPIEHPC), 2019, pp. 11-20.
Warke, Amit, et al., "Storage Service Orchestration with Container Elasticity", 2018 IEEE 4th International Conference on Collaboration and Internet Computing DOI 10.1109/CIC.2018.00046, 2018, pp. 283-292.
"Backup & Secure", USGS, 2018.
"Runtime System", Wikipedia, 2018.
"Cascade Mode Deployment", https://docs.vmware.com/en/Unified-Access-Gateway/3.10/com.vmware.uag-310-deploy-config. doc/GUID-AWT-DEPLOYMENT-CASCADE.html#GUID-AWT-DEPLOYMENT-CASCADE, Jul. 2, 2019, p. 2.
"Mobile Content Management-Datasheet", https://www.vmware.com/content/dam/digitalmarketing/vmware/en/pdf/workspace-one/vmware-airwatch-mcm-datasheet.pdf, Mar. 12, 2019, p. 4.
"VMware Identity Manager API", https://developer.vmware.com/apis/57/#api, Aug. 2018, p. 2.
"VMware Tanzu Service Mesh built on VMware NSX", VMware | https://www.vmware.com/content/dam/digitalmarketing/vmware/en/pdf/docs/vmw-tanzu-service-mesh-solution-brief.pdf, Mar. 2020, p. 3.
"VMware Tunnel (Per-App VPN) Connections in Cascade Mode", https://docs.vmware.com/en/Unified-Access-Gateway/3.10/com.vmware.uag-310-deploy-config.doc/GUID-B69DD1E7-ED88-4574-912C-DBA071BC9D6F.html, May 31, 2019, p. 2.
"VMware Unified Access Gateway: Use Cases—Feature Walkthrough", https://www.youtube.com/watch?v=xaN9mYOJqAs, Oct. 27, 2017, p. 1.
"Workspace One Uem 1810 introduces support for Android Enterprise fully managed devices with work profiles", https://bayton.org/blog/2018/10/workspace-one-uem-1810-introduces-support-for-android-enterprise-fully-managed-devices-with-work-profiles/, Oct. 29, 2018, p. 11.
Bayton, Jason, "Android Enterprise COPE enrolment comparison: WS1 UEM / MI Core", https://www.youtube.com/watch?v=QSJu3xFzjMw, Oct. 28, 2018, p. 1.
Coronado, Jose, "Deploying Tanzu Application Service for Kubernetes on Kind", VMware Tanzu | https://vxcoronado.net/index.php/2020/05/31/deploying-tanzu-application-service-for-kubernetes-on-kind/, May 31, 2020, p. 8.
Poitras, Steven, "The Nutanix Bible", https://nutanixbible.com/, Apr. 9, 2019, pp. all.
Schweighhardt, Mark, "VMware Tanzu Service Mesh, built on VMware NSX is Now Available!", VMware | https://blogs.vmware.com/networkvirtualization/2020/03/vmware-tanzu-service-mesh-built-on-vmware-nsx-is-now-available.html/, Mar. 10, 2020, p. 8.

* cited by examiner

Add Service Domain

Select Infrastructure Provider
Select where you want to add this Service Domain

1st Provider
Connect to add a Service Domain on a 1st Cluster Provider on-prem Cluster or a Cloud Cluster

1st Cloud Provider
Connect to add a Service Domain on 1st Cloud Provider

2nd Cloud Provider
Connect to add a Service Domain on 2nd Cloud Provider

3rd Cloud Provider
Connect to add a Service Domain on 3rd Cloud Provider

4th Cloud Provider
Connect to add a Service Domain on 4th Cloud Provider

Bare Metal
Register a Service Domain from a Bare Metal Servers, Lean more about how to do this here

[Cancel] [Next]

*FIG. 5B*

Add Service Domain

Select Infrastructure Provider
Select where you want to add this Service Domain

1st Provider
Connect to add a Service Domain on a 1st Cluster Provider on-prem Cluster or a Cloud Cluster

1st Cloud Provider
Connect to add a Service Domain on 1st Cloud Provider

2nd Cloud Provider
Connect to add a Service Domain on 2nd Cloud Provider

3rd Cloud Provider
Connect to add a Service Domain on 3rd Cloud Provider

4th Cloud Provider
Connect to add a Service Domain on 4th Cloud Provider

Bare Metal
Register a Service Domain from a Bare Metal Servers, Lean more about how to do this here

[Cancel] [Next]

*FIG. 5C*

Add Service Domain

1st Cluster Provider
Connect to add a Service Domain on an on-prem cluster or a Cloud Cluster Name Profile
[Select existing or create new]

Add Categories

No categories added to this Service Domain
◆ Add Category

Cancel   Add

*FIG. 5D*

Add Service Domain

1st Cluster Provider
Connect to add a Service Domain on an on-prem cluster or a Cloud Cluster Name
[Swiss-Pvt-Cloud-SD]

Profile
[Swiss-Private-Cloud-PC ▼]

Cluster Name
[Swiss-Private-Cloud-1 ▼]

Add Categories

No categories added to this Service Domain
[+ Add Category]

[Cancel] [Add]

Add Service Domain

Select Infrastructure Provider
Select where you want to add this Service Domain

1st Provider
Connect to add a Service Domain on a 1st Cluster Provider on-prem Cluster or a Cloud Cluster

1st Cloud Provider
Connect to add a Service Domain on 1st Cloud Provider

2nd Cloud Provider
Connect to add a Service Domain on 2nd Cloud Provider

3rd Cloud Provider
Connect to add a Service Domain on 3rd Cloud Provider

4th Cloud Provider
Connect to add a Service Domain on 4th Cloud Provider

Bare Metal
Register a Service Domain from a Bare Metal Servers, Lean more about how to do this here

[Cancel] [Next]

*FIG. 5G*

Add Service Domain

Select Infrastructure Provider
Select where you want to add this Service Domain

1st Provider
Connect to add a Service Domain on a 1st Cluster Provider on-prem Cluster or a Cloud Cluster

1st Cloud Provider
Connect to add a Service Domain on 1st Cloud Provider

2nd Cloud Provider
Connect to add a Service Domain on 2nd Cloud Provider

3rd Cloud Provider
Connect to add a Service Domain on 3rd Cloud Provider

4th Cloud Provider
Connect to add a Service Domain on 4th Cloud Provider

Bare Metal
Register a Service Domain from a Bare Metal Servers, Lean more about how to do this here

[Cancel] [Next]

*FIG. 5H*

Add Service Domain

2nd Cloud Provider
Connect to add a Service Domain on 2nd Cloud Provider

Name

Profile
Select existing or create new

Add Categories

No categories added to this Service Domain

+ Add Category

Cancel    Add

FIG. 5I

Add Service Domain

2nd Cloud Provider
Connect to add a Service Domain on 2nd Cloud Provider

Name
CP2-US-East-SD

Profile
Create New...

Region
US East

Access Key
AK19ASH634KJH32

Secret
***********

Add Categories

No categories added to this Service Domain

✦ Add Category

Cancel   Add

*FIG. 5J*

≡ | Service Domains | ◉ Paas ⊙ | | | | | Admin ˅ |
|---|---|---|---|---|---|---|---|
| | | | | | | | ☰ Filters |
| List | ✥ Service Domain | | | | | | |
| Alerts | Name | Status | CPU | Memory | Storage Capacity | Data Connectors | Alerts |
| | Swiss-Pvt-Cloud-SD | ● Healthy | 15% | 6 of 16 GB | 266 of 2048 GB | - | ⋯ |
| | CP2-US-East-SD | ● Healthy | 15% | 6 of 16 GB | 266 of 2048 GB | - | ⋯ |

*FIG. 5K*

Create Data Pipeline

Build
[Genomic-analysis-preprocess]

① Build ② Deployment

Input
- ⦿ Select by Type
- ○ Select Individually

Type [T1-dev-access] [8 inputs ▾]
———— Advanced ▾ ————

Transformation

(T)

✦ Add Functions

No Functions have been added

Output

(O)

✦ Add Destinations

No Destinations have been added

[Cancel] [Next]

Create Data Pipeline

① Build ② Deployment

Build
[Genomic-analysis-preprocess]

Input
- ⦿ Select by Type
- ○ Select Individually

Type [T1-dev-access] [8 inputs ▾]

———— Advanced ▾ ————

Transformation
- ⦿ Function  ○ Container

Function [Predictive-analysis-preprocess ▾]   Upload

Output

Destination
[Service Domain ▾]
Data from each of the Selected data sources will be processed and stored on the Service Domains associated with them Endpoint Type
[Objects ▾]

Endpoint Name
[genomic-analysis-preprocess]
A bucket with this name will automatically be created if it doesn't exist.

[Cancel] [Next]

*FIG. 6J*

| ≡ | ⊙ Paas ⊙ | | | Developer ∨ |
|---|---|---|---|---|
| Data Pipelines | ✦ Create Data Pipeline | | | |
| List | ○ Name ⁝ | Input Data Connectors ⁝ | Output ⁝ | Status ⁝ |
| Alerts | ○ Genomic-analysis-preprocess | T1-dev-access | Objects | ● Healthy |

Create Container Spec

① YAML ② Deployment

Choose File | No file chosen
Please upload a yaml file

Normal ▾ | Show Diff

```
 3  metadata:
 4    name: patient-symptom-insights
 5    labels:
 6      app: patient-symptom-insights
 7  spec:
 8    replicas: 1
 9    selector:
10      matchLabels:
11        app: patient-symptom-insights
12    template:
13      metadata:
14        labels:
15          app: patient-symptom-insights
16      spec:
17        containers:
18        - name: symptom-interface-app-container
19          image: 77301640873.dkr.ecr.us-west-2.CP2.com/patient-inference:1
20          imagepullpolicy: Always
21          env:
22          - name: MODEL_NAME
23            value: symptom-interface
24          - name: MODEL_VERSION
25            value: "1"
26          - name: AI_INTERFACE_ENDPOINT
27            value: "inferencemaster-svc.default.svc.cluster.local"
28            command: ["/usr/local/bin/python", "/carrec/main.py"]
29        - name: kafka-output-container
30          image: 77301640873.dkr.ecr.us-west-2.CP2.com/kafka-op:1
31          imagePullPolicy: Always
32          env:
```

Cancel | Next

*FIG. 7C*

Create Container Spec

① YAML  ② Deployment

Name
[Patient-diagnosis-insight]

Deploy To
Select the service domains where you want to deploy these containers

| ☑ Name ⇵ | Status ⇵ |
|---|---|
| ☑ Swiss-Pvt-Cloud-SD | ○ Healthy |
| ☑ CP2-US-East-SD | ○ Healthy |

[Cancel] [Deploy]

*FIG. 7D*

| Containers | ☰ | ⊡ Paas ⊙ | | | Developer ⌄ |
|---|---|---|---|---|---|
| List | ⊕ Create Container Spec | | | | |
| Alerts | ☐ Name ⇅ | Deployed to ⇅ | No. of containers ⇅ | Status ⇅ | |
| | ☐ Patient-diagnosis-insight | 2 Service Domains | 3 | ● Healthy | |

*FIG. 7E*

Create Application Template

① Template ② Properties

Name
Genomics Analysis Dev

Description
This is some sample description of this application for genome predictive analytics running on XI Paas

C Containers
No Container Specs added to this template yet

+ Container Spec

DP Data Pipelines
No Data Pipelines added to this template yet

+ Data Pipeline

ML ML Models
No ML Models added to this template yet

+ ML Model

DS Data Services
No Data Services added to this template yet

+ Data Service

Cancel  Next

*FIG. 8*

Create Application Template

① Template  ② Properties

Name
Genomics Analysis Dev

Description
This is some sample description of this application for genome predictive analytics running on Paas

Container Specs  ✦ Container Spec
Name ⁝  Action
Patient-Symptom-insights  Remove

Data Pipelines  ✦ Data Pipeline
Name ⁝  Action
Genomic-analysis-preprocess  Remove All associated input data connectors and output data services will be added to the template automatically

ML Models  ✦ ML Model
Name ⁝  Action
Symptom-detection  Remove

Cancel   Next

FIG. 9A

Create Application Template

① Template ② Properties

Access to this template
○ Everyone on the Nutanix App Store
● Private to your organization

App icon
Upload an image file 60px X 60px (Optional)

[Browse]

[Cancel] [Create and Publish]

*FIG. 9B*

PLATFORM-AS-A-SERVICE DEPLOYMENT INCLUDING SERVICE DOMAINS

CROSS REFERENCE TO RELATED APPLICATION(S)

This application claims the benefit under 35 U.S.C. 119 of the earlier filing date of U.S. Provisional Application 62/913,115 entitled "PLATFORM-AS-A-SERVICE DEPLOYMENT INCLUDING SERVICE DOMAINS", filed Oct. 9, 2019. The aforementioned provisional application is hereby incorporated by reference in its entirety, for any purpose.

BACKGROUND

Public and private cloud service platforms can have varying architectures, including differing sets of host operating systems or hypervisors, differing sets of offered services, differing platform-specific application programming interfaces (APIs), different data storage structures, etc. As such, a customer that has operations on multiple cloud service platforms may need to independently develop a different version of an application to accommodate the differences between cloud platform architectures. The process of developing multiple versions of the same application to make it compatible with each desired cloud service platform can be technically complicated and time consuming, as it requires gathering an understanding the architecture of each target cloud service platform, and then developing a version of the application based on the architecture. Such an undertaking may beyond the scope or expertise of many information technology (IT) departments.

BRIEF DESCRIPTION OF THE DRAWINGS

Figure 5F:
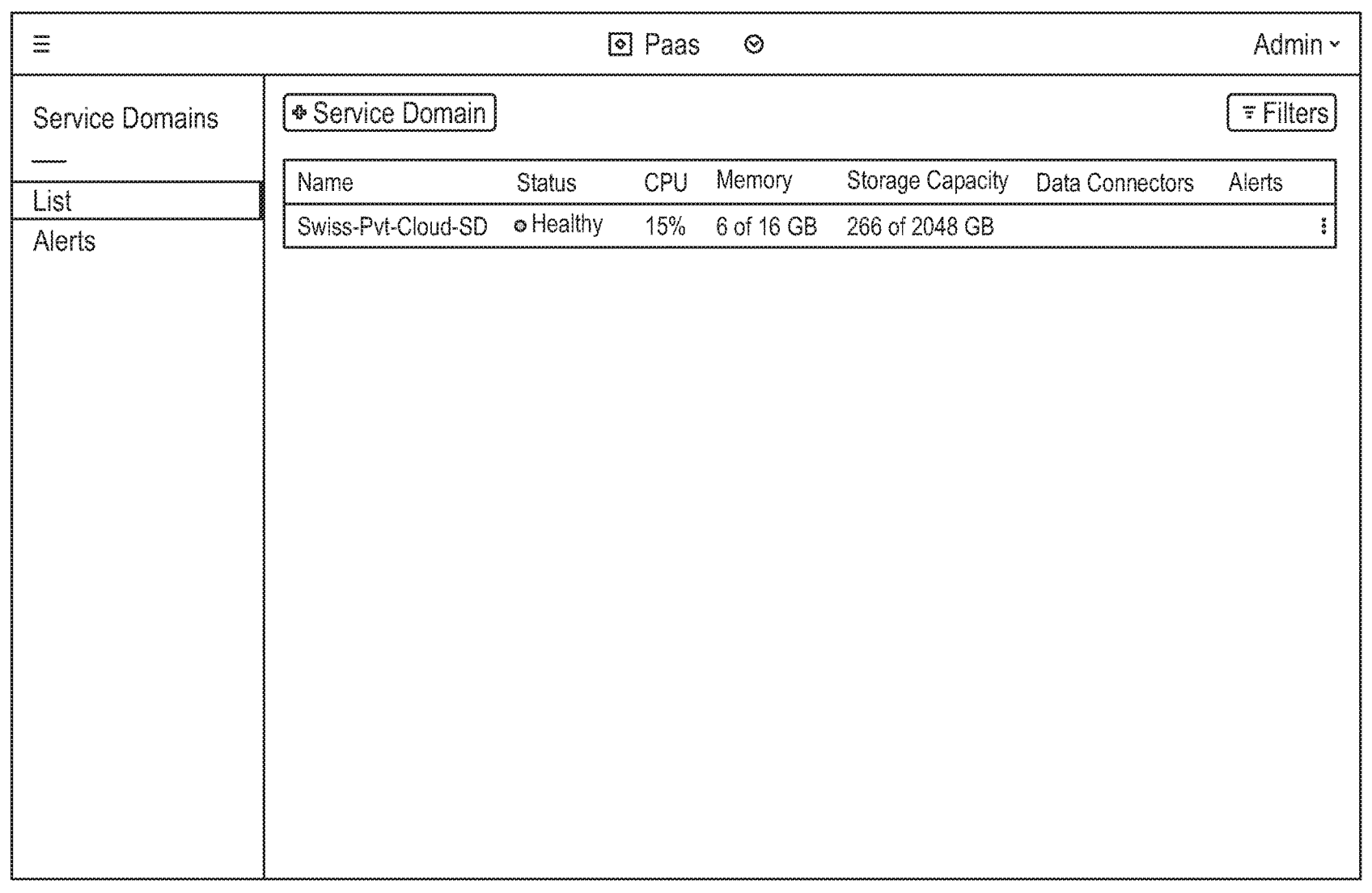

FIGS. 5A-5K are depictions of exemplary user interface screenshots for deploying a service domain, in accordance with an embodiment of the present disclosure.

FIGS. 6A-6L are depictions of exemplary user interface screenshots for generating and deploying a data pipeline to one or more service domains, in accordance with an embodiment of the present disclosure.

FIGS. 7A-7E are depictions of exemplary user interface screenshots for generating and deploying a container to one or more service domains, in accordance with an embodiment of the present disclosure.

FIG. 8 is a depiction of an exemplary user interface screenshot for selecting a type of application to be deployed to one or more service domains, in accordance with an embodiment of the present disclosure.

FIGS. 9A-9B are depictions of exemplary user interface screenshots for generating and deploying an application to one or more service domains, in accordance with an embodiment of the present disclosure.

DETAILED DESCRIPTION

Figure 1:
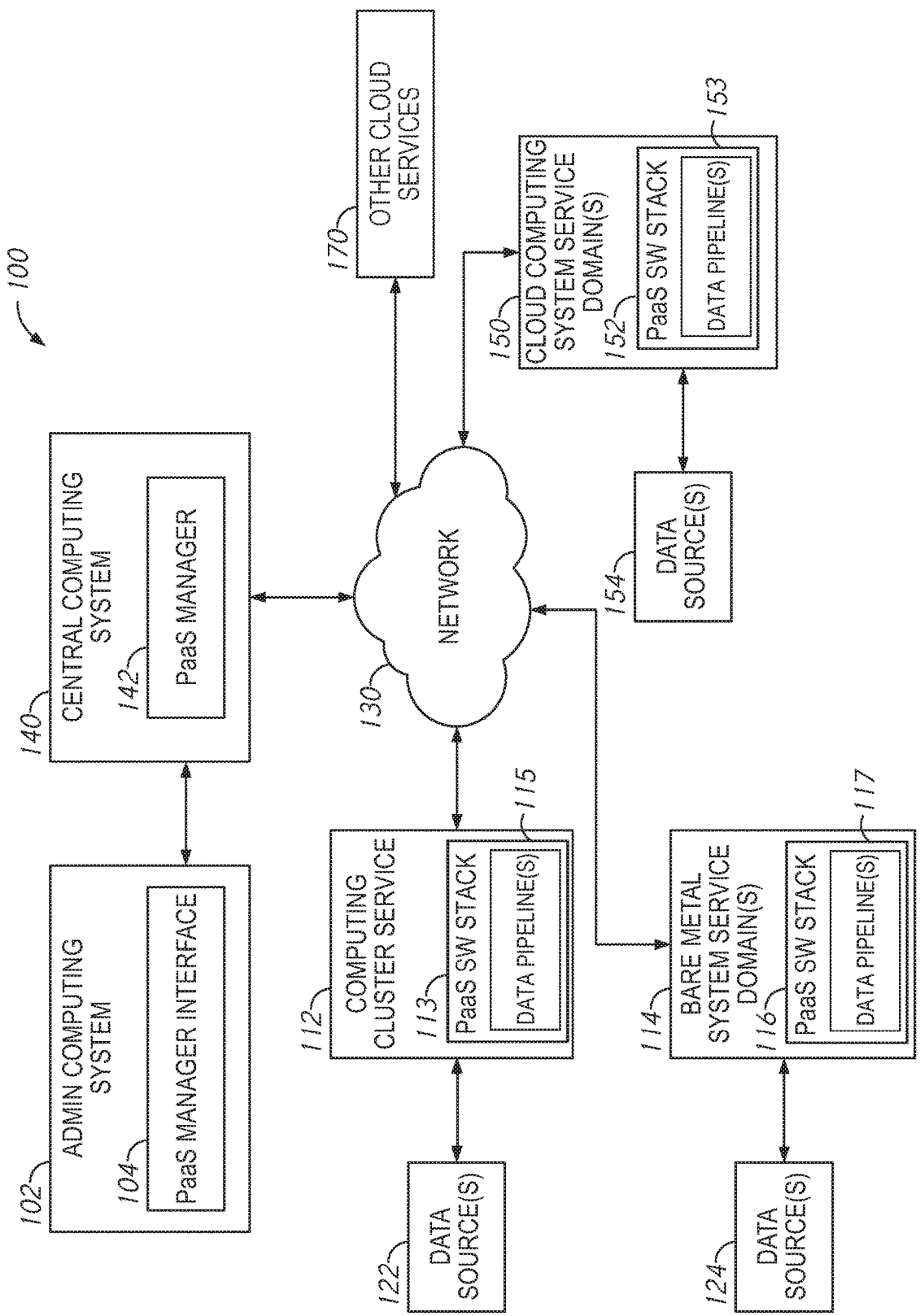
FIG. 1 is a block diagram of a multi-cloud platform as a service system, in accordance with an embodiment of the present disclosure.

Examples described herein include a platform-as-a-service PaaS infrastructure and application lifecycle manager (PaaS manager) configured to create and deploy service domains on one or more different types of computing platforms. The PaaS manager is also configured to build and deploy different types of applications to the service domains. An application may include a data pipeline, a container, a data service, a machine learning (ML) model, etc., or any combination thereof. A user may elect to deploy an application to a type of platform based on various criteria, such as type of service, proximity to source data, available computing resources (e.g., both type and available capacity), platform cost, etc., or any combination thereof. Types of platforms may include a cloud platform (e.g., Nutanix®, Amazon® Web Services (AWS®), Google® Cloud Platform, Microsoft® Azure®, etc.), a computing node cluster, a bare metal platform (e.g., platform where software is installed directly on the hardware, rather than being hosted in an operating system), an IoT platform (e.g., edge systems, etc.).

Generally, when an application is generated, successful execution may depend on availability of various additional supporting services, such as a read/write data services (e.g., publish/subscribe service, search services, etc.), data pipeline services, ML inference services, container management services, other runtime or data services, etc., or any combination thereof. The PaaS manager may abstract deployment of the additional supporting services, as some services may be platform-specific, as well as may manage a lifecycle of the service containers, upgrades and/or patches to the services, etc. Thus, a user may provide information directed to an application to be deployed to the PaaS manager and identify one or more target service domains, and the PaaS manager may deploy respective application bundle for each of the one or more target service domains that includes the application and/or the additional supporting services. In some examples, the supporting services may already be hosted on the service domain, which may preclude the necessity of including those services in the application bundle. The PaaS manager may deploy the respective application bundle to the corresponding one of the one or more identified target service domains. The ability of the PaaS manager to abstract platform-specific details for creating and deploying a service domain and deploying an application bundle to run in a service domain may make deployment of applications to different service domains and across different computing platforms more efficient for a user. This may allow a customer to operate in a hybrid of various different computing platform types in a way that differences between the various computing platform types is transparent to an end customer. The ability to deploy applications across different computing platforms may allow for more flexible multi-cloud and/or multi-platform data integration for a customer. The PaaS manager may be hosted in a cloud computing system (e.g., public or private) and/or may be delivered/distributed using a software as a service (SaaS) model, in some examples.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of a multi-cloud platform as a service system 100, in accordance with an embodiment of the present disclosure. The system 100 may include one or more of any of computing cluster service domain(s) 112 coupled to respective data source(s) 122, bare metal system service domain(s) 114 coupled to respective data source(s) 124, and the cloud computing system service domain(s) 150 coupled to respective data source(s) 154. The system 100 may further include a central computing system 140 coupled to the one or more of the computing cluster service domain(s) 112, the bare metal system service domain(s) 114, and/or the cloud computing system service domain(s) 150 via a network 130 to manage communication within the system 100.

The network 130 may include any type of network capable of routing data transmissions from one network device (e.g., of the computing cluster service domain(s) 112, the bare metal system service domain(s) 114, the central computing system 140, and/or the cloud computing system service domain(s) 150) to another. For example, the network 130 may include a local area network (LAN), wide area network (WAN), intranet, or a combination thereof. The network 130 may include a wired network, a wireless network, or a combination thereof.

Each of the computing cluster service domain(s) 112 may be hosted on a respective computing cluster platform having multiple computing nodes (e.g., each with one or more processor units, volatile and/or non-volatile memory, communication or networking hardware, input/output devices, or any combination thereof) and may be configured to host a respective PaaS software stack 113. Each of the bare metal system service domain(s) 114 may be hosted on a respective bare metal computing platform (e.g., each with one or more processor units, volatile and/or non-volatile memory, communication or networking hardware, input/output devices, or any combination thereof) and may be configured to host a respective PaaS software stack 116. Each of the cloud computing system service domain(s) 150 may be hosted on a respective public or private cloud computing platform (e.g., each including one or more data centers with a plurality of computing nodes or servers having processor units, volatile and/or non-volatile memory, communication or networking hardware, input/output devices, or any combination thereof) and may be configured to host a respective PaaS software stack 152. "Computing platform" referred to herein may include any one or more of a computing cluster platform, a bare metal system platform, or a cloud computing platform. "Service domain" used herein may refer to any of the computing cluster service domain(s) 112, the bare metal system service domain(s) 114, or the cloud computing system service domain(s) 150. The PaaS software stacks (e.g., any of the PaaS software stack, the PaaS software stack PaaS software stack 113, PaaS software stack 116, and/or PaaS software stack 152) may include platform-specific software configured to operate on the respective system. The software may include instructions that are stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform functions, methods, etc., described herein.

The data source(s) 122, 124, and 154 may each include one or more devices or repositories configured to receive, store, provide, generate, etc., respective source data. The data sources may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, a data lake (e.g., a large capacity data storage system that holds raw data) or any other source of data consumed, retrieved, stored, or generated by the service domains. The service domain construct may allow a customer to deploy applications to locations proximate relevant data, in some examples. In some examples, the service domain construct may allow a customer to deploy applications to computing platforms that have a particular computing resource (e.g., hardware or software configuration) and/or based on computing resource capacity.

In some examples, various components of the system 100 may need access to other cloud services 170. To facilitate communication with the other cloud services 170, the data pipelines of the PaaS software stacks may be configured to provide interfaces between applications hosted on one or more of the service domains 112, 114, or 150 and the other cloud services 170 via the network 130. In some examples, the data pipeline(s) 115, 117, and/or 153 (data pipeline(s)) hosted on any of the PaaS software stacks 113, 116, and/or 152, respectively, may be configured to provide data from the other cloud services 170 to applications hosted on one or more of the service domains 112, 114, or 150 to aggregate, transform, store, analyze, etc., the data.

Each of the PaaS software stacks may include one or more applications, data pipelines, ML models, containers, data services, etc., or any combination thereof (e.g., applications). The applications may be configured to receive, process/transform, and output data from and to other applications. The applications may be configured to process respective received data based on respective algorithms or functions to provide transformed data. At least some of the applications may be dependent on availability of supporting services to execute, such as communication services, runtime services, read-write data services, ML inference services, container management services, etc., or any combination thereof.

The data pipeline(s) 115, 117, and/or 153 may provide a conduit through which data can be passed (e.g., provided and/or received) between applications hosted in the PaaS Software stack, as well as a conduit through which data can be passed among the different service domains or to the other cloud services 170 via the network 130. Generally, a data pipeline of the data pipeline(s) 115, 117, and/or 153 may include an input component to receive data from another data pipeline, any data source, or other service domain or cloud service 170 (via the network 130); an output component to provide data to another data pipeline, any data source, or other service domain or cloud service 170 (via the network 130); and at least one transform component configured to manipulate the input data to provide the output data.

The data pipeline(s) 115, 117, and/or 153 can be constructed using computing primitives and building blocks, such as VMs, containers, processes, or any combination thereof. In some examples, the data pipeline(s) 115, 117, and/or 153 may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls.

In some examples, the PaaS software stacks may further include respective ML inference services that are configured to load and execute respective ML model applications. Thus, the ML inference services may be configured to receive a request for an inference or prediction using a ML model, and to load a ML model application that includes the requested ML model into an inference engine. The inference engine may be configured to select a runtime based on a hardware configuration of the edge system, and execute the ML model on input data to provide inference or prediction data. The inference engine may be configured to optimize the ML model for execution based on a hardware configuration. The ML inference service may provide the benefits of GPU abstraction, built-in frameworks for ML model execution, decoupling application development from hardware deployment, etc. In some examples, the PaaS manager 142 may be configured to access data from one or more data lakes (e.g., via the data sources 122, 124, 154), transform the data from the one or more data lakes, train a ML model using the transformed data, and generate an ML model application based on the trained ML model.

The one or more applications of the PaaS software stacks may be implemented using a containerized architecture that is managed via a container orchestrator. The container orchestration managed by a PaaS infrastructure and application lifecycle manager (PaaS manager) 142 under the service domain construct may handle (e.g., using middleware) underlying details of the PaaS related to containerized management complexity, orchestration, security, and isolation, thereby make it easier for a customer or user to focus on managing the applications. The management may be scalable via categories. In some examples, the service domains may be configured to support multi-tenant implementations, such that data is kept securely isolated between tenants. The applications communicate using application programming interface (API) calls, in some examples. In some examples, the supporting services may also be implemented in the containerized architecture.

The PaaS manager 142 hosted on the central computing system 140 may be configured to centrally manage the PaaS infrastructure (e.g., including the service domains) and manage lifecycles of deployed applications. The central computing system 140 may include one or more computing nodes configured to host the PaaS manager 142. The central computing system 140 may include a cloud computing system and the PaaS manager 142 may be hosted in the cloud computing system and/or may be delivered/distributed using a software as a service (SaaS) model, in some examples. In some examples, the PaaS manager 142 may be distributed across a cluster of computing nodes of the central computing system 140.

In some examples, an administrative computing system 102 may be configured to host a PaaS manager interface 104. The PaaS manager interface 104 may be configured to facilitate user or customer communication with the PaaS manager 142 to control operation of the PaaS manager 142. The PaaS manager interface 104 may include a graphical user interface (GUI), APIs, command line tools, etc., that are each configured to facilitate interaction between a user and the PaaS manager 142. The PaaS manager interface 104 may provide an interface that allows a user to develop template applications for deployment of the service domains, identify on which service domains to deploy applications, move applications from one service domain to another, remove an application from a service domain, update an application, service domain, or PaaS software stack (e.g., add or remove available services, update deployed services, etc.).

In some examples, the PaaS manager 142 may be configured to manage, for each of the computing platforms, creation and deployment of service domains, creation and deployment of application bundles to the PaaS software stacks, etc. For example, the PaaS manager 142 may be configured to create and deploy service domains on one or more of the computing platforms. The computing platforms may include different hardware and software architectures that may be leveraged to create and deploy a service domain. Thus, the PaaS manager 142 may be configured to manage detailed steps associated with generating a service domain in response to a received request. FIGS. 5A-5K are depictions of exemplary user interface screens for creating and deploying a service domain, in accordance with an embodiment of the present disclosure. The interfaces depicted in FIGS. 5A-5K may be implemented in the GUI of the PaaS manager interface 104. As shown in FIGS. 5A-5K, a user may step through various user interface pages to create and deploy a service domain by selecting various options, such as a computing platform (e.g., infrastructure provider) (FIGS. 5B, 5C, 5G, and 5H), selecting a name for the service domain (FIGS. 5D, 5E, 5I and 5J). A list of available or generated service domains (e.g., FIGS. 5F and 5K) may be provided in the interface.

The PaaS manager 142 may also be configured to build and deploy different types of applications to one or more of the service domains. A user may elect to deploy an application to a type of platform based on various criteria, such as type of and/or availability of a service, proximity to source data, available computing resources (e.g., both type and available capacity), platform cost, etc., physical location of the platform, or any combination thereof.

When an application is generated, successful execution may depend on availability of various additional supporting services, such as a read/write data services (e.g., publish/subscribe service, search services, etc.), ML inference services, container management services, runtime services, etc., or any combination thereof. The PaaS manager 142 may abstract deployment of the additional supporting services, as some of these may be platform-specific. Thus, a user may provide information directed to an application to be deployed to the PaaS manager 142 and identify one or more target service domains, and the PaaS manager 142 may deploy the application to the target service domains. The target service domains provide services to be used by the application, and accordingly, the application need not include services provided by the service domain. Moreover, the application need not take platform-specific actions which may be typically required for starting those services. The PaaS manager 142 may deploy the respective application to the corresponding one of the one or more identified target service domains.

The ability of the PaaS manager 142 to abstract platform-specific details for creating and deploying a service domain and creating and deploying an application or application bundle to run in a service domain may make deployment of applications to different service domains more efficient for a user, as well as may provide a customer with a wider selections of platforms than would otherwise be considered. Thus, the service domain construct may allow a customer to focus on core concerns with an application, while shifting consideration of supporting services to the PaaS manager 142 and the service domains. The service domain construct may also make applications more "light weight" and modular for more efficient deployment to different service domains. The PaaS manager interface 104 may provide a GUI interface that FIG. 8 is a depiction of an exemplary user interface screenshot for selecting a type of application to be deployed to one or more service domains, in accordance with an embodiment of the present disclosure. The interface depicted in FIG. 8 may be implemented in the GUI of the PaaS manager interface 104. As shown in FIG. 8, a developer to create an application using a template. The template may include template processes for utilizing various services that may be provided by a service domain. As shown in FIG. 8, the service domain may provide container services, data pipelines, ML models, and/or data services. To develop an application utilizing such a service, the developer may select and define the services to be used through the template provided in the GUI of the PaaS manager interface 104.

Figure 6A:
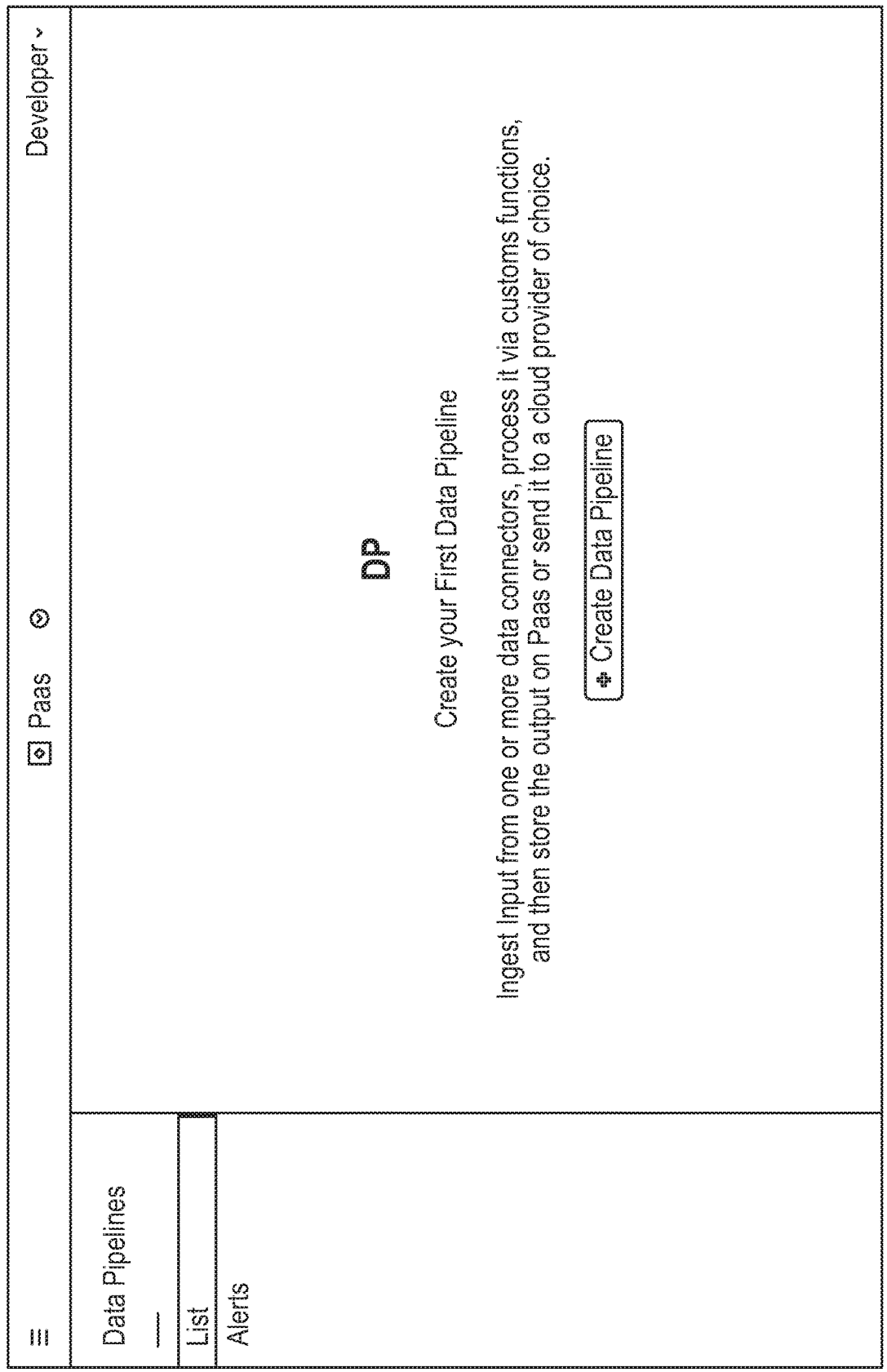
Figure 6B:
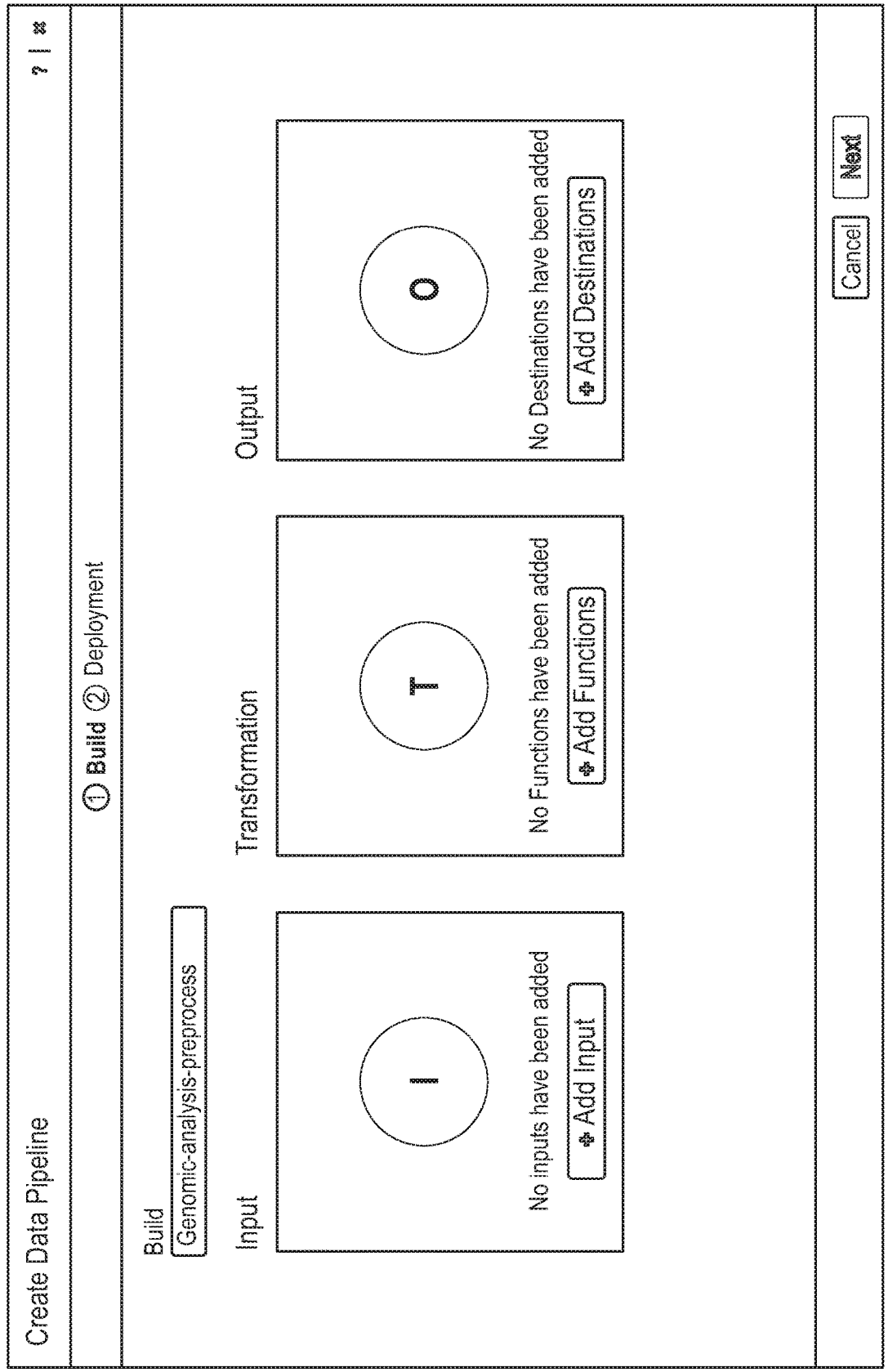
Figure 6D:
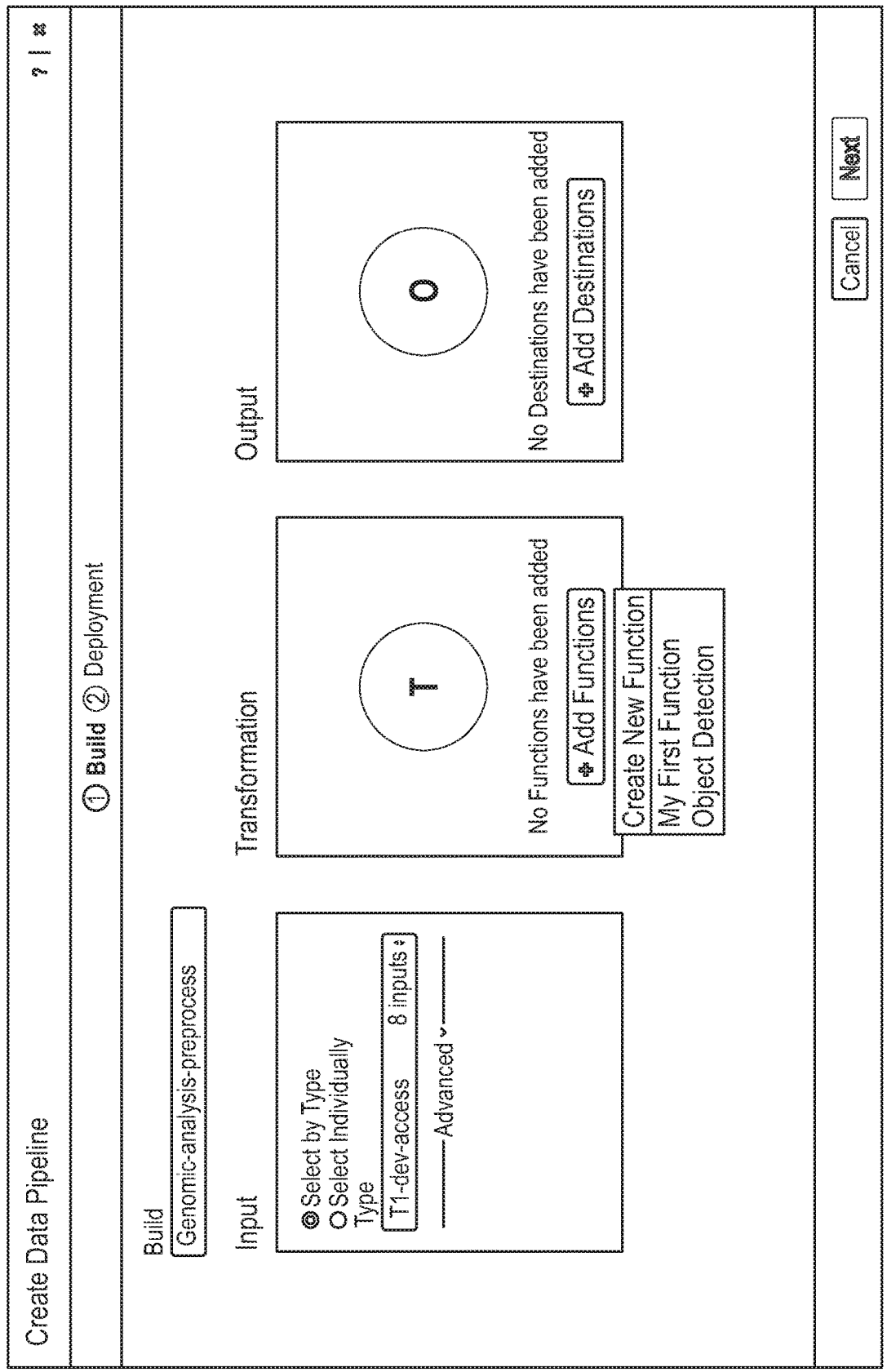
Figure 6E:
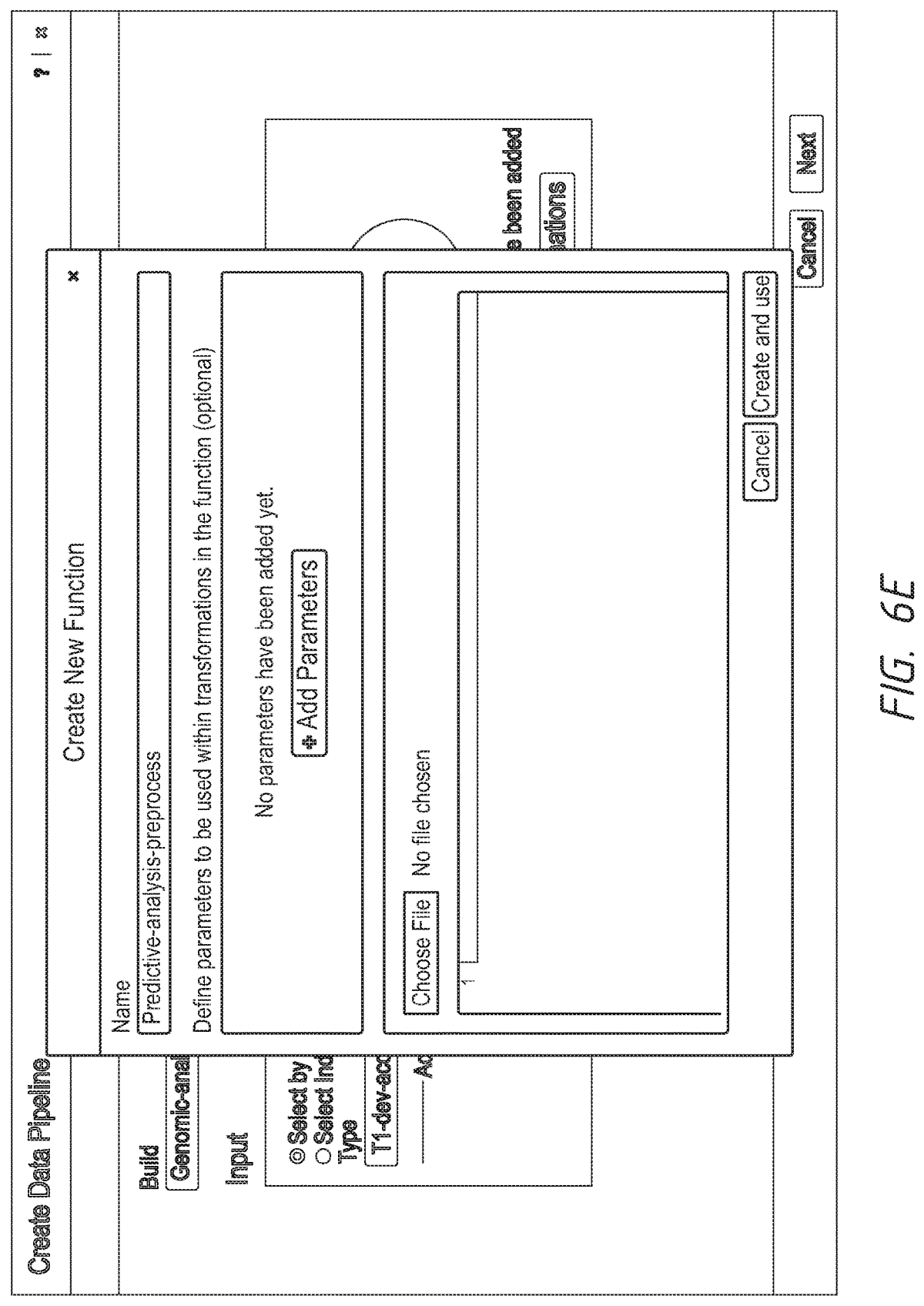
Figure 6F:
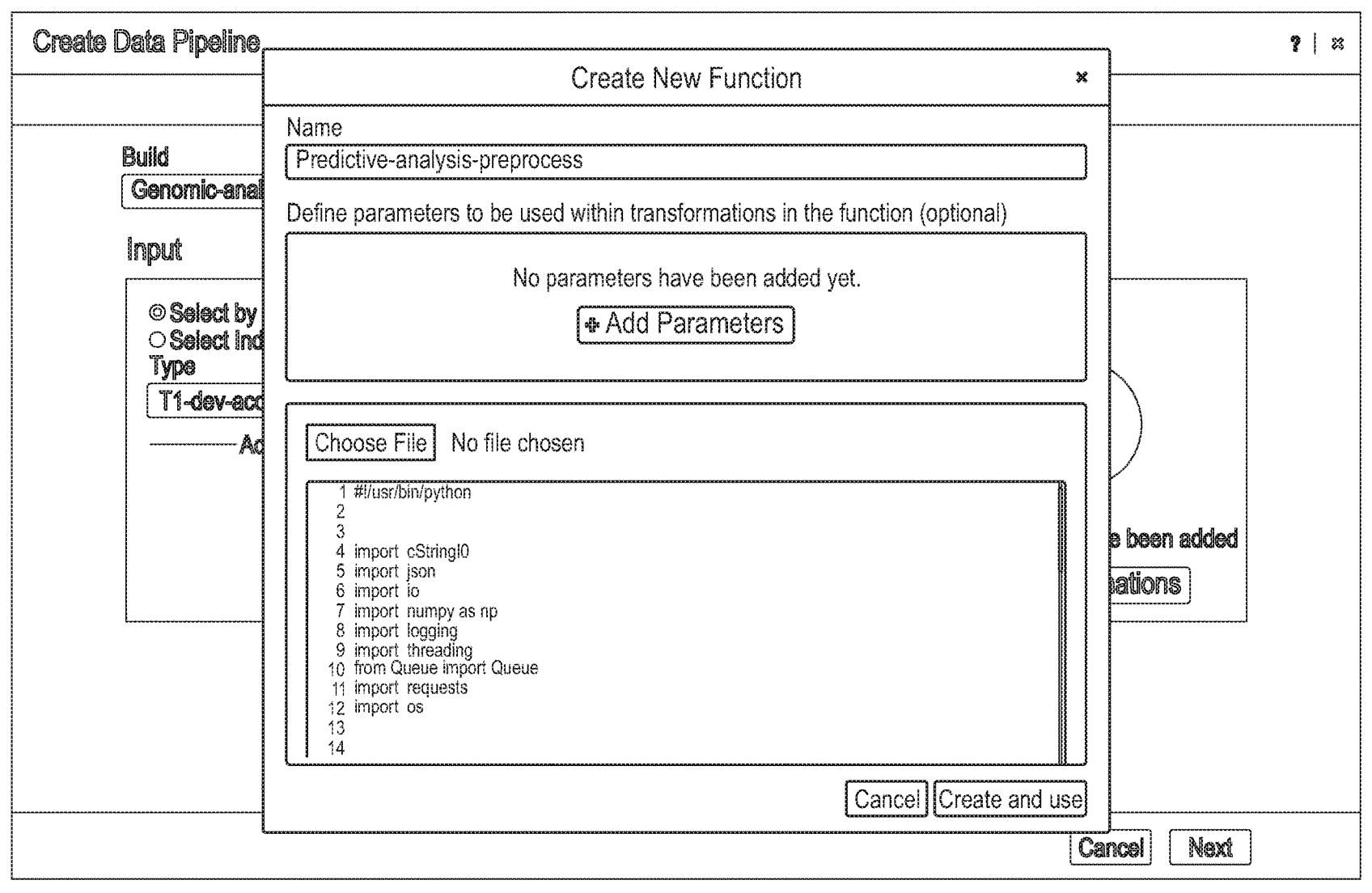
Figure 6G:
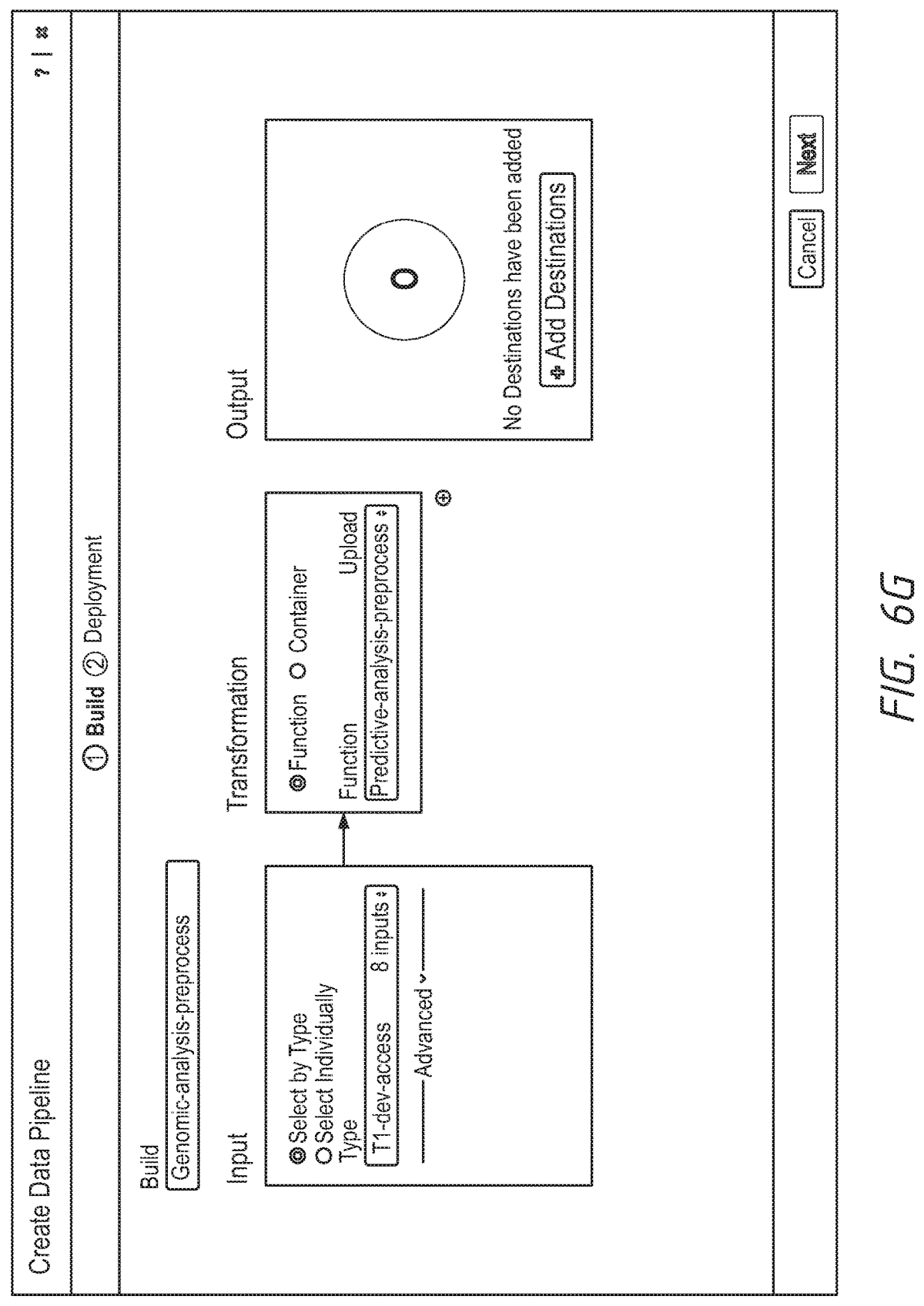
Figure 6H:
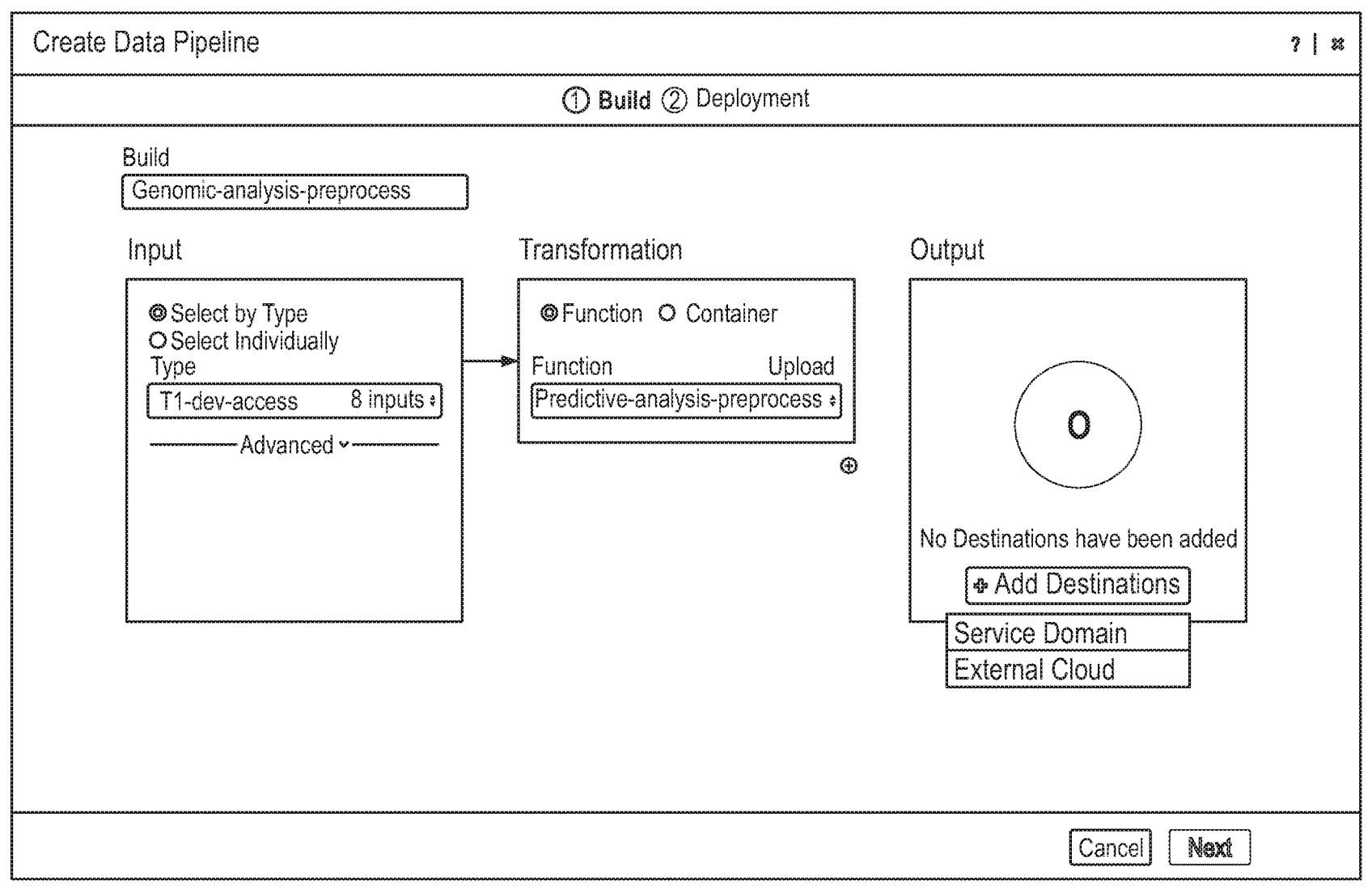
Figure 6I:
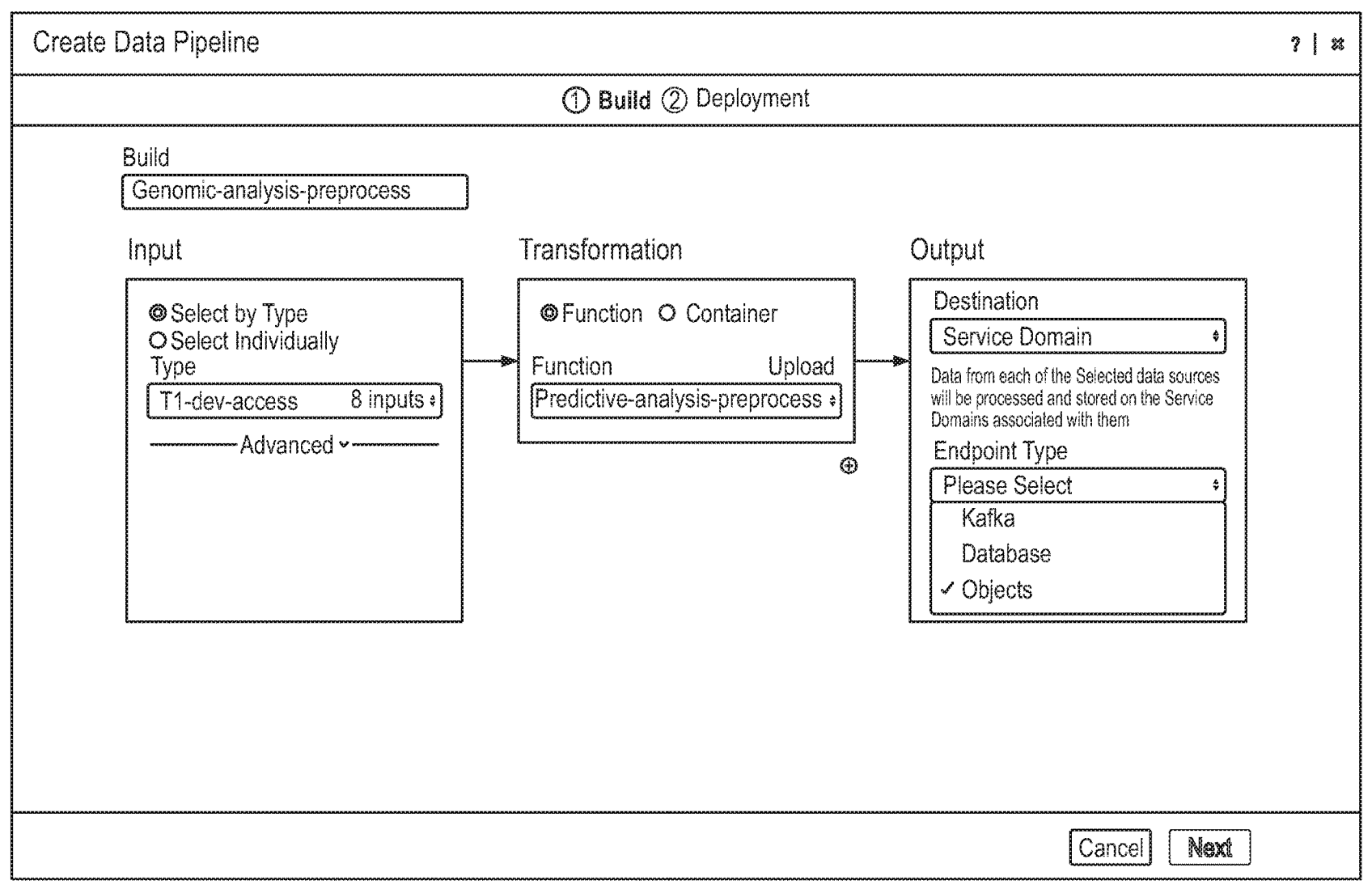
Figure 6K:
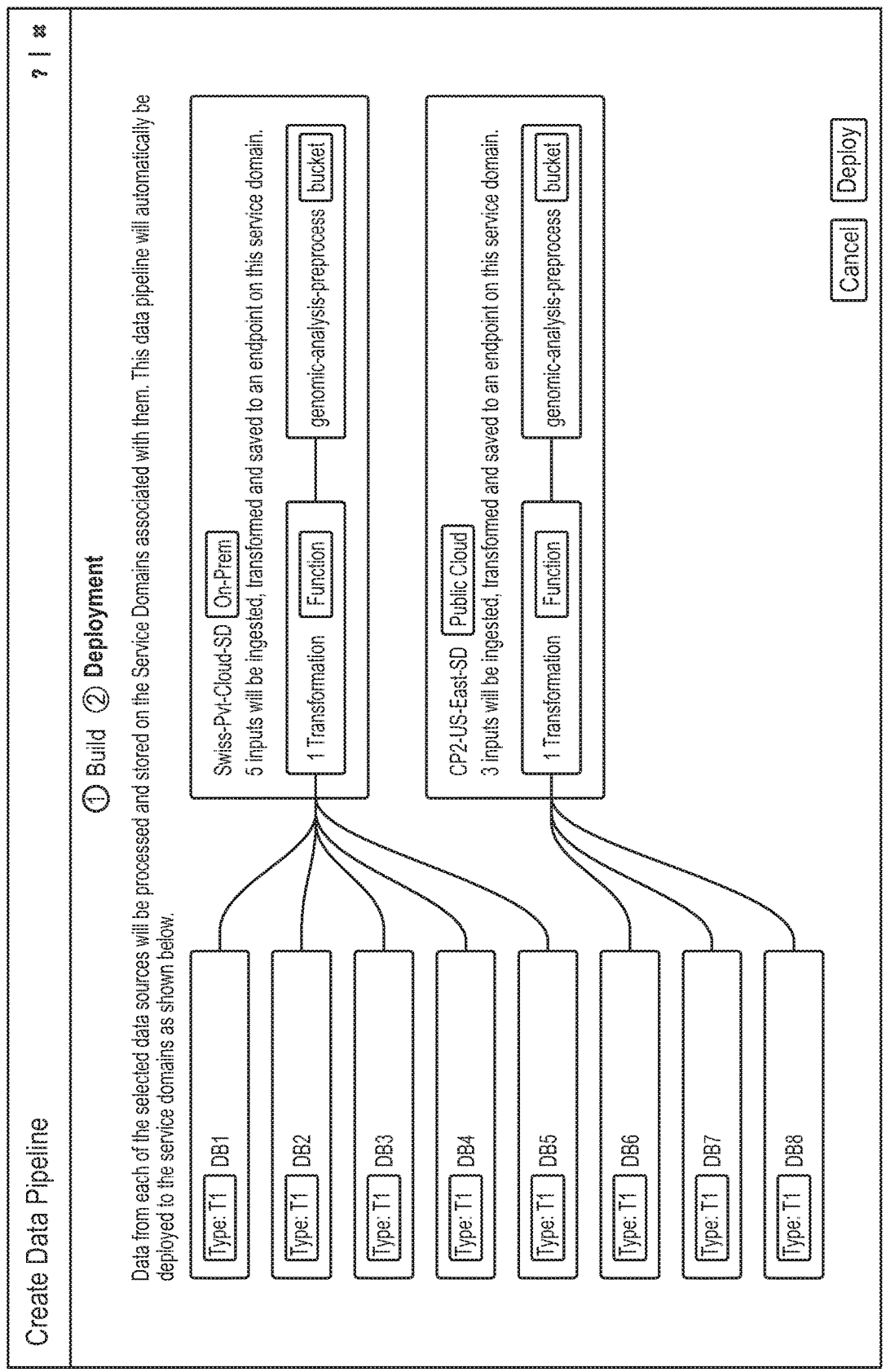

FIGS. 6A-6L are depictions of exemplary user interface screenshots for generating and deploying a data pipeline (e.g., one of the data pipeline(s) 115, 117, and/or 153) to one or more service domains, in accordance with an embodiment of the present disclosure. The interfaces depicted in FIGS. 6A-6L may be implemented in the GUI of the PaaS manager interface 104. FIG. 6A includes an interface in the GUI of the PaaS manager interface 104 to add an input (shown being performed in FIGS. 6B and 6C), transformation (shown being performed in FIGS. 6D-6G), or output (shown being performed in FIGS. 6H-6J). FIG. 6K depicts an interface for mapping of source data to a data pipeline, and FIG. 6L may provide a list of generated data pipelines.

Figure 7A:
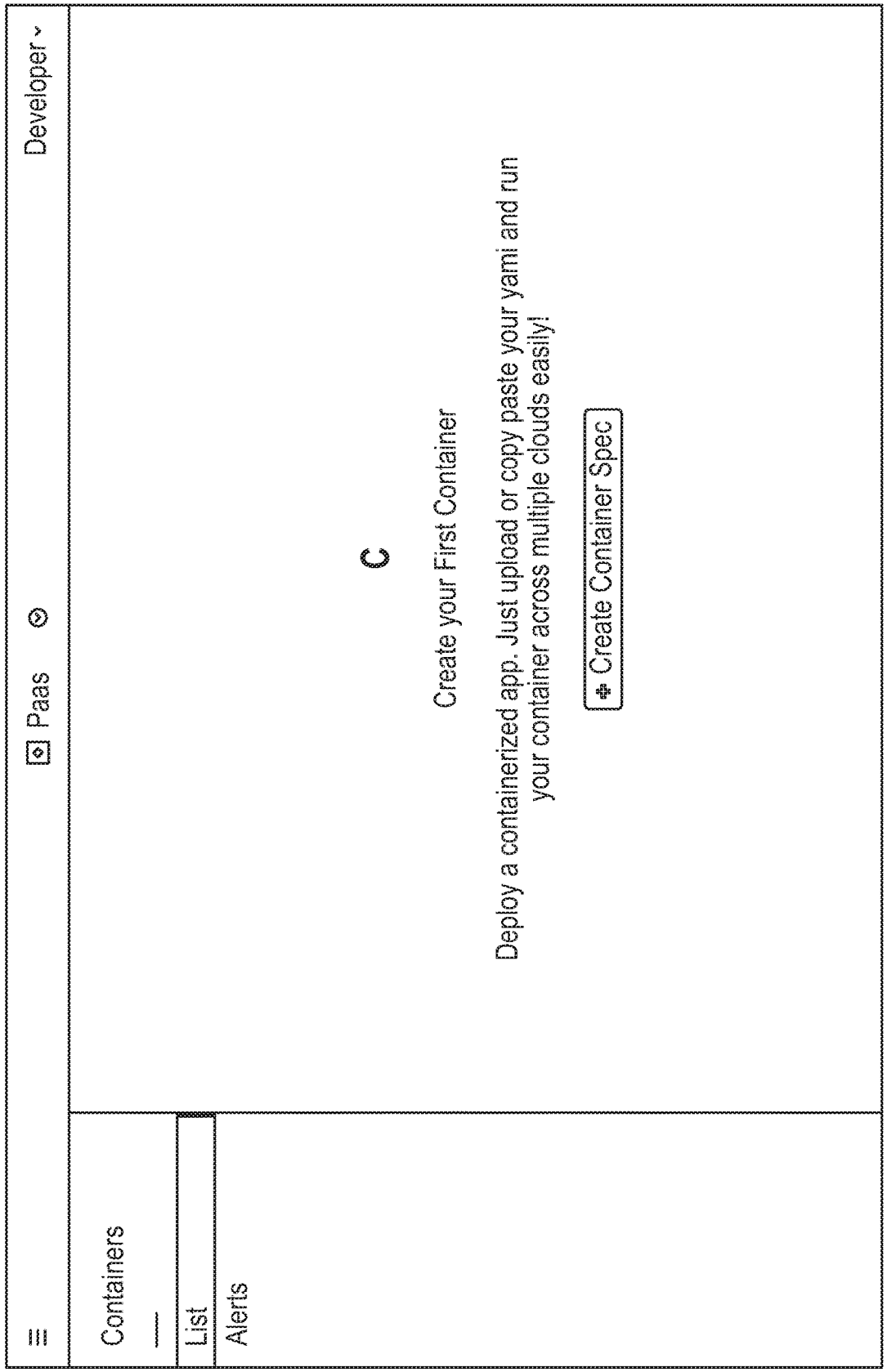
Figure 7B:
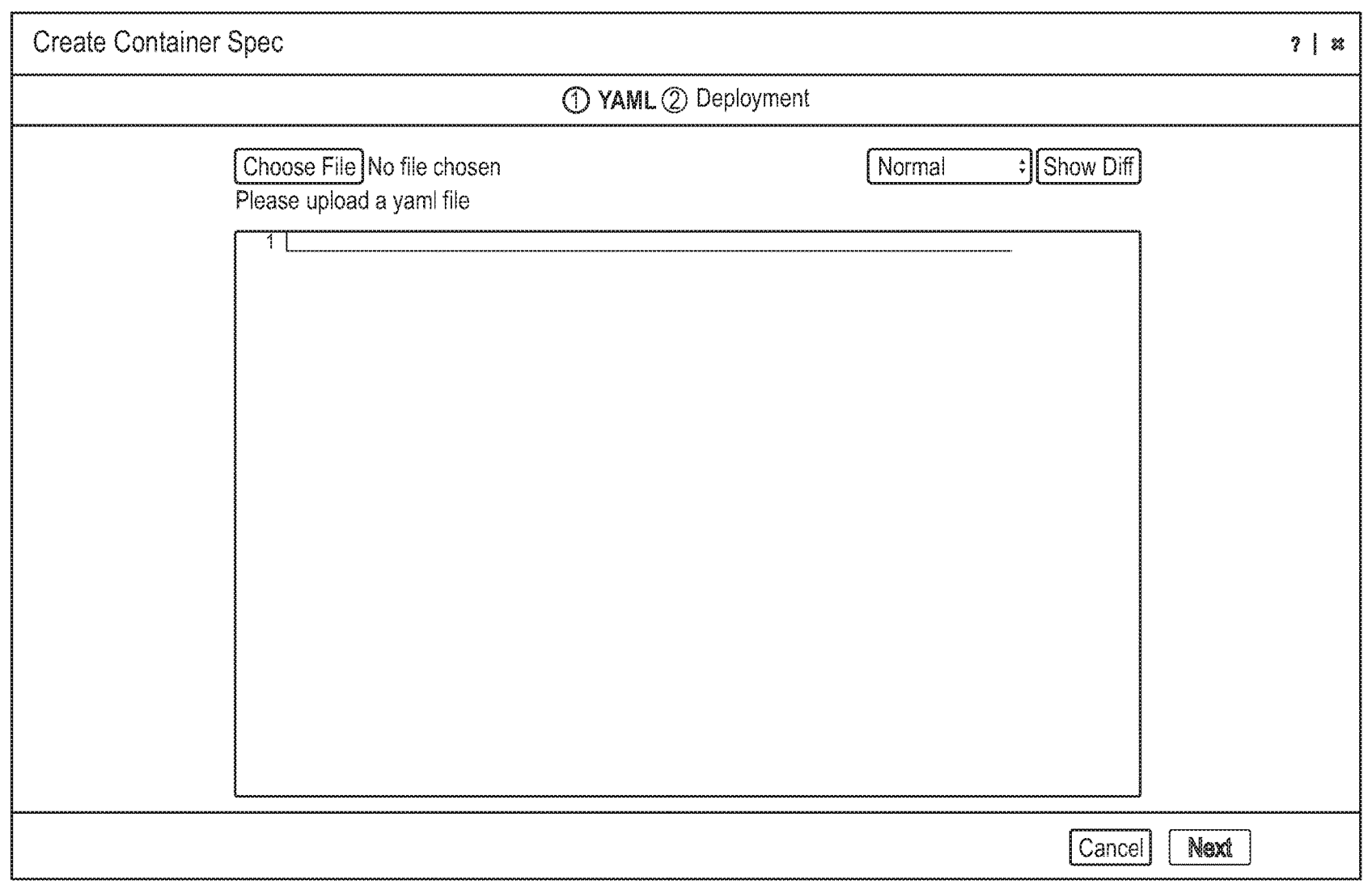

FIGS. 7A-7E are depictions of exemplary user interface screenshots for generating and deploying a container to one or more service domains, in accordance with an embodiment of the present disclosure. The interfaces depicted in FIGS. 7A-7E may be implemented in the GUI of the PaaS manager interface 104. FIGS. 7B and 7C depict interfaces for entering container code, FIG. 7D depicts an interface for selecting where the container is deployed, and FIG. 7E depicts an interface showing a list of deployed containers.

FIGS. 9A-9B are depictions of exemplary user interface screenshots for generating and deploying an application to one or more service domains, in accordance with an embodiment of the present disclosure. The interfaces depicted in FIGS. 9A-9B may be implemented in the GUI of the PaaS manager interface 104. FIG. 9A depicts an interface that allows a user to select the parts that make up an application template, and FIG. 9B depicts an interface that allows a user to select whether the application template is public or private.

The PaaS manager 142 may be configured to generate (e.g., build, construct, update, etc.) and distribute the applications to selected service domains based on the platform-specific architectures of the computing platforms. In some examples, the PaaS manager 142 may facilitate creation of one or more application constructs and may facilitate association of a respective one or more service domains with a particular application construct (e.g., in response to user input).

For example, in response to a request for deployment of a new application, the PaaS manager 142 may determine whether the new application is properly configured to run in a target service domain. The PaaS manager 142 may ensure that service dependencies for the new application are met in the service domains, in some examples, such as deployment of supporting services for the application to a target service domain.

In operation, the system 100 may include any number and combination of computing platforms that may collectively span any type of geographic area (e.g., across continents, countries, states, cities, counties, facilities, buildings, floors, rooms, systems, units, or any combination thereof). The computing platforms within the system 100 may include a wide array of hardware and software architectures and capabilities. Each of the computing platforms may host respective software stacks that include various applications that are configured to receive, process, and/or transmit/store data from one or more of the connected data sources 120 and/or from other applications. The service domain architecture may allow formation of a hybrid cloud computing platform where applications and data can be moved across different computing platforms.

Each of the applications may be configured to process data using respective algorithms or functions, and well as leveraging respective supporting services. In some examples, the algorithms or functions may include any other user-specified or defined function to process/transform/select/etc. received data. The supporting services may include runtime services, read/write data services, communication services, ML inference services, search services, etc., or any combination thereof. In some examples, the service domain for a respective computing platform may be configured to share data with other service domains. The one or more applications of the PaaS software stacks may be implemented using a containerized architecture that is managed via a container orchestrator. The applications may communicate using application programming interface (API) calls, in some examples.

The PaaS manager 142 may be configured to generate or update service domains to host the PaaS software stacks on the computing platforms. The service domains may include deployment of one or more virtual machines or other construct configured to host the respective PaaS software stack. The service domain may identify computing resource types and allocation.

The PaaS manager 142 may be further configured to deploy applications to the PaaS software stacks, as well as supporting services for execution of the application. A user may elect to deploy an application to a type of platform based on various criteria, such as type of service, proximity to source data, available computing resources (e.g., both type and available capacity), platform cost, etc., or any combination thereof. When an application is generated, successful execution may depend on availability of various additional supporting services, such as a read/write data services (e.g., publish/subscribe service, search services, etc.), ML inference services, container management services, runtime services, etc., or any combination thereof. The PaaS manager 142 may abstract deployment of the additional supporting services, as some of these may be platform-specific. Thus, a user may provide information directed to an application to be deployed to the PaaS manager 142 and identify one or more target service domains, and the PaaS manager 142 may deploy a respective application bundle to each of the one or more target service domains, along with a bundle of additional supporting services required for execution of the application bundle.

Figure 2:
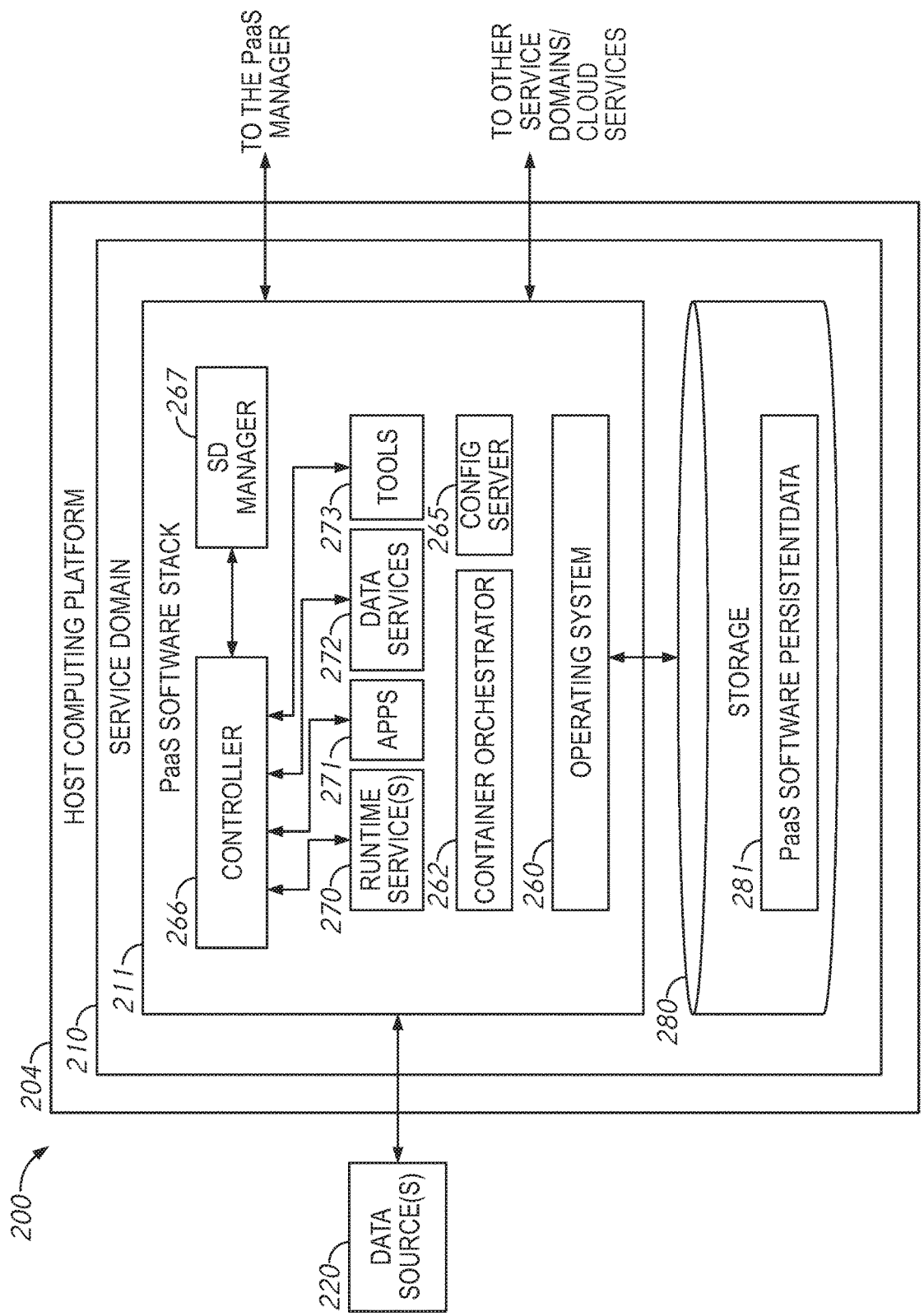
FIG. 2 is a block diagram of a Service Domain, in accordance with an embodiment of the present disclosure.

FIG. 2 is a block diagram of a computing system 200, in accordance with an embodiment of the present disclosure. The computing system 200 may include a host computing platform 204 configured to host a service domain 210. The service domain 210 may be configured to host a PaaS software stack 211 and storage 280. The host computing platform 204 may include any of a computing cluster platform, a bare metal system platform, a server, a public or private cloud computing platform, an edge system, or any other computing platform capable of hosting the 210. Any of the computing cluster service domain(s) 112, the bare metal system service domain(s) 114, and/or the cloud computing system service domain(s) 150 of FIG. 1 may implement a respective version of the service domain 210. Any of the PaaS software stack 113, the PaaS software stack 116, and/or PaaS software stack 152 of FIG. 1 may implement some or all of the PaaS software stack 211.

In some examples, the service domain 210 may be configured to host a respective PaaS software stack 211. In some examples, the service domain 210 may include a VM hosted on the host computing platform 204.

The storage 280 may be configured to store PaaS software persistent data 281, such as software images, binaries and libraries, metadata, etc., to be used by the service domain 210 to load and execute the PaaS software stack 211. In some examples, the PaaS software persistent data 281 includes instructions that when executed by a processor of the service domain 210, causes the PaaS software stack 211 to perform functions described herein. The storage may include local storage (solid state drives (SSDs), hard disk drives (HDDs), flash or other non-volatile memory, volatile memory, or any combination thereof), cloud storage, networked storage, or any combination thereof.

The PaaS software stack 211 includes a bundle hosted on a physical layer of the service domain 210 to facilitate communication with one or more data source(s) 220 (e.g., internal or external to the system 200), other service domains and/or computing platforms and/or a PaaS infrastructure and application lifecycle manager (e.g., the PaaS manager 142 of FIG. 1). The data source(s) 220 may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, or any other source of data consumed, retrieved, stored, or generated by the service domains.

The PaaS software stack 211 may host an underlying operating system 260 configured to interface the physical layer of the service domain 210. In some examples, a controller 266, a service domain manager 267, a container orchestrator 262, and a configuration server 265 may run on the operating system 260. In some examples, the PaaS software stack 211 may include a bare metal implementation that runs the operating system 260 directly on the physical layer. In other examples, the PaaS software stack 211 may include a virtualized implementation with a hypervisor running on the physical layer and the operating system 260 running on the hypervisor.

The container orchestrator 262 may be configured to manage a containerized architecture of one or more of runtime services 270, applications 271, data services 272, and/or tools 273). In some examples, the container orchestrator 262 may include Kubernetes® container orchestration software. The runtime services 272 may include containers, functions, machine learning, AI inferencing, data pipelines, or any combination thereof. The data services may include publish/subscribe services, file system storage, databases, block storage, object storage, or any combination thereof. The tools 273 may include real-time monitoring tools, debugging tools, logging tools, alerting tools, or any combination thereof. The applications 271 may include any executable application configured to run in the PaaS software stack 211.

The service domain manager 267 may communicate with the PaaS manager to receive application bundles (e.g., including applications and supporting services) for installation (e.g., including the runtime services 270, the applications 271, the data services 272, and/or the tools 273), as well as data source connectivity information, etc. In some examples, the service domain manager 267 may also be configured to provide configuration and status information to a centralized PaaS manager, including status information associated with one or more of the data source(s) 220.

In response to information received from the PaaS manager, the service domain manager 267 may be configured to provide instructions to the controller 266 to manage the runtime services 270, the applications 271, the data services 272, and/or the tools 273 supported by the service domain 210, which may include causing installation or upgrading of one of the runtime services 270, the applications 271, the data services 272, and/or the tools 273; removing one of the runtime services 270, the applications 271, the data services 272, and/or the tools 273; starting or stopping new instances of the runtime services 270, the applications 271, the data services 272, and/or the tools 273; allocating service domains to host the PaaS software stack 211; or any combination thereof. The PaaS software persistent data 281 may include application data that includes data specific to the respective application to facilitate execution, including supporting services.

As previously described, the runtime services 270, the applications 271, the data services 272, and/or the tools 273 may be implemented using a containerized architecture to receive source data from one or more of the data source(s) 220 (e.g., or from applications) and to provide respective transformed data at an output by applying a respective function or algorithm to the received source data. In some examples, the applications may include any user-specified or defined function or algorithm.

In some examples, the runtime services 270 may include data pipelines (e.g., the data pipeline(s) 115, 117, and/or 153 of FIG. 1) that are constructed using a group of containers (e.g., a pod) that each perform various functions within the data pipeline runtime services 270, the applications 271, the data services 272, and/or the tools 273, such as subscriber, data processor, publisher, connectors that transform data for consumption by another container within the application or pod, etc.). In some examples, the definition of stages of a constructed data pipeline may be described using a user interface or REST API, with data ingestion and movement handled by connector components built into the data pipeline. Thus, data may be passed between containers of a data pipeline using API calls.

In some examples, the data pipelines may provide a conduit through which data can be passed (e.g., provided and/or received) between applications hosted in the PaaS Software stack, as well as a conduit through which data can be passed among different service domains or to other cloud services (e.g., via a network). Generally, a data pipelines may include an input component to receive data from another data pipeline, any data source, or other service domain or cloud service; an output component to provide data to another data pipeline, any data source, or other service domain or cloud service; and at least one transform component configured to manipulate the input data to provide the output data.

In operation, the PaaS software stack 211 hosted on the service domain 210 may control operation of the service domain 210 within an IoT system to facilitate communication with one or more data source(s) 220. The service domain manager 267 of the PaaS software stack 211 may communicate with the PaaS manager to receive allocation of a service domain to host the PaaS software stack 211 and receive application bundles for installation (e.g., including the runtime services 270, the applications 271, the data services 272, and/or the tools 273) on the PaaS software stack 211. In response to information received from the PaaS manager, the service domain manager 267 may be configured to provide instructions to the controller 266 to manage the application bundles, which may include causing installation or upgrading of one of the application bundles; removing one of the application bundles; starting or stopping new instances of the application bundles, allocating hardware resources to the PaaS software stack 211 as part of the service domain, storing data in and/or retrieving data from the PaaS software persistent data 281, or any combination thereof.

The runtime services 270, the applications 271, the data services 272, and/or the tools 273 may receive source data from one or more of the data source(s) 220 (e.g., or from other applications) and to provide respective transformed data at an output by applying a respective function or algorithm to the received source data. In some examples, the respective algorithms or functions may include machine learning (ML) or artificial intelligence (AI) algorithms. In some examples, the applications may cause the received and/or processed source data to be provided to other service domains via the configuration server 265. In some examples, the applications may be implemented using a containerized architecture deployed and managed by the container orchestrator 262. Thus, the container orchestrator 262 may deploy, start, stop, and manage communication with the runtime services 270, the applications 271, the data services 272, and/or the tools 273 within the PaaS software stack 211.

Figure 3:
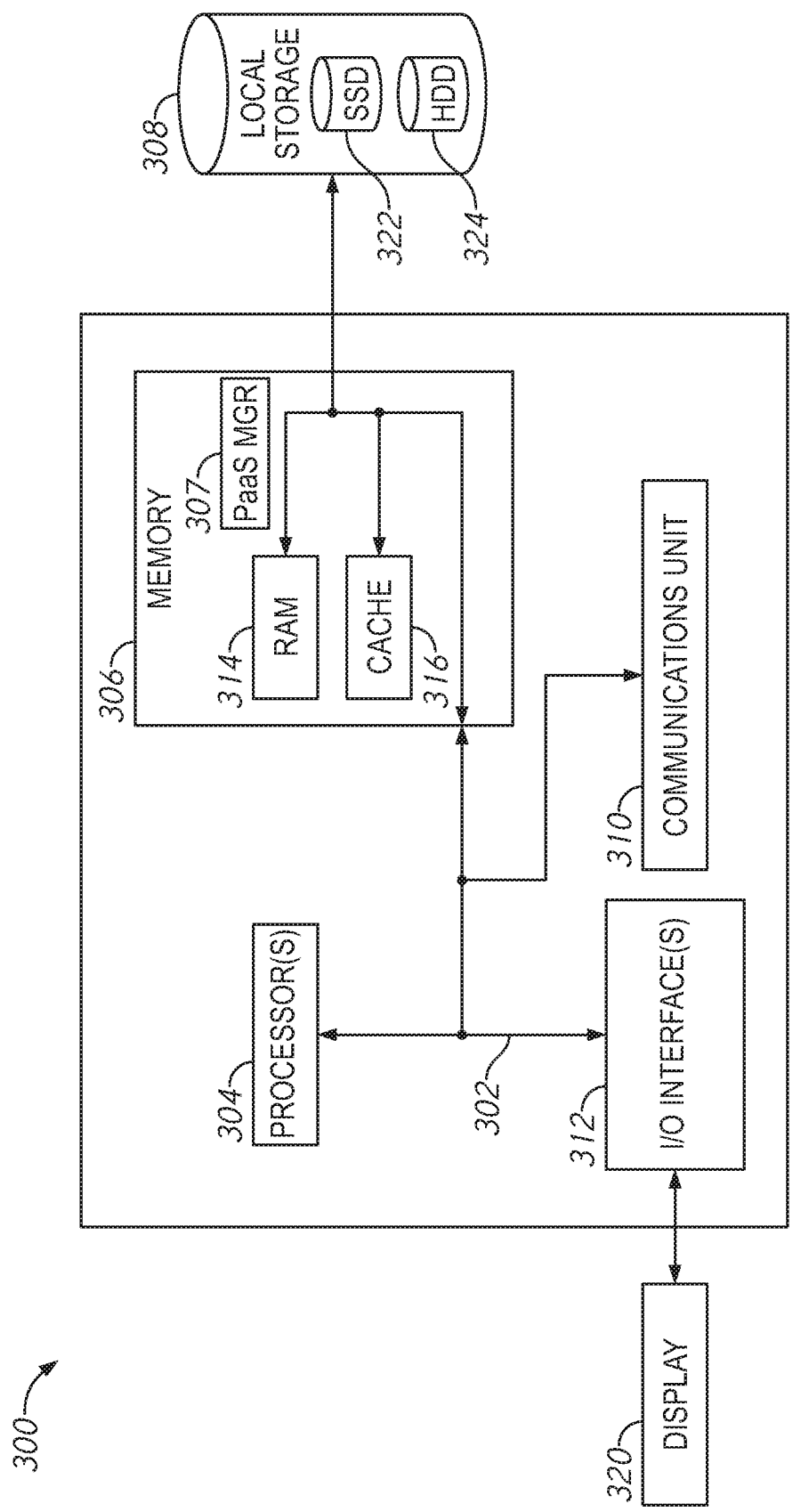
FIG. 3 is a block diagram of components of a computing node in accordance with an embodiment of the present disclosure.

FIG. 3 depicts a block diagram of components of a computing node (device) 300 in accordance with an embodiment of the present disclosure. It should be appreciated that FIG. 3 provides only an illustration of one implementation and does not imply any limitations with regard to the environments in which different embodiments may be implemented. Many modifications to the depicted environment may be made. The computing node 300 may implemented as at least part of the central computing system 140 (or any other computing device or part of any other system described herein). In some examples, the computing node 300 may be a standalone computing node or part of a cluster of computing nodes configured to host a PaaS manager 307. In addition to or alternative to hosting the PaaS manager 307, the computing node 300 may be included as at least part of the computing cluster, the bare metal computing platform, or the cloud computing platform described with reference to FIG. 1 configured to host the described service domains.

The computing node 300 includes a communications fabric 302, which provides communications between one or more processor(s) 304, memory 306, local storage 308, communications unit 310, I/O interface(s) 312. The communications fabric 302 can be implemented with any architecture designed for passing data and/or control information between processors (such as microprocessors, communications and network processors, etc.), system memory, peripheral devices, and any other hardware components within a system. For example, the communications fabric 302 can be implemented with one or more buses.

The memory 306 and the local storage 308 are computer-readable storage media. In this embodiment, the memory 306 includes random access memory RAM 314 and cache 316. In general, the memory 306 can include any suitable volatile or non-volatile computer-readable storage media. In an embodiment, the local storage 308 includes an SSD 322 and an HDD 324.

Various computer instructions, programs, files, images, etc. may be stored in local storage 308 for execution by one or more of the respective processor(s) 304 via one or more memories of memory 306. In some examples, local storage 308 includes a magnetic HDD 324. Alternatively, or in addition to a magnetic hard disk drive, local storage 308 can include the SSD 322, a semiconductor storage device, a read-only memory (ROM), an erasable programmable read-only memory (EPROM), a flash memory, or any other computer-readable storage media that is capable of storing program instructions or digital information.

The media used by local storage 308 may also be removable. For example, a removable hard drive may be used for local storage 308. Other examples include optical and magnetic disks, thumb drives, and smart cards that are inserted into a drive for transfer onto another computer-readable storage medium that is also part of local storage 308.

In some examples, the local storage may be configured to store a PaaS manager 307 that is configured to, when executed by the processor(s) 304, create and deploy service domains on one or more different types of computing platforms. The PaaS manager 307 may also be configured to, when executed by the processor(s) 304, deploy different types of applications to the service domains. An application may include a data pipeline, a container, a data service, a machine learning (ML) model, etc., or any combination thereof. A user may elect to deploy an application to a type of platform based on various criteria, such as type of service, proximity to source data, available computing resources (e.g., both type and available capacity), platform cost, etc., or any combination thereof. Types of platforms may include a cloud platform (e.g., Nutanix, Amazon® Web Services (AWS®), Google® Cloud Platform, Microsoft® Azure®, etc.), a computing node cluster, a bare metal platform, an IoT platform (e.g., edge systems, etc.). When an application is generated, successful execution may depend on availability of various additional supporting services, such as a read/write data services (e.g., publish/subscribe service, search services, etc.), ML inference services, container management services, runtime services, etc., or any combination thereof. The PaaS manager 307 may abstract deployment of the additional supporting services, as some of these may be platform-specific. Thus, a user may provide information directed to an application to be deployed to the PaaS manager 307 and identify one or more target service domains, and the PaaS manager 307 may generate a respective application bundle for each of the one or more target service domains that includes the application and the additional supporting services. The PaaS manager 307 may deploy the respective application bundle to the corresponding one of the one or more identified target service domains. The ability of the PaaS manager 307 to abstract platform-specific details for creating and deploying a service domain and creating an application bundle to run in a service domain may make deployment of applications to different service domains more efficient for a user.

Communications unit 310, in these examples, provides for communications with other data processing systems or devices. In these examples, communications unit 310 includes one or more network interface cards. Communications unit 310 may provide communications through the use of either or both physical and wireless communications links.

I/O interface(s) 312 allows for input and output of data with other devices that may be connected to computing node 300. For example, I/O interface(s) 312 may provide a connection to external device(s) 318 such as a keyboard, a keypad, a touch screen, and/or some other suitable input device. External device(s) 318 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 308 via I/O interface(s) 312. I/O interface(s) 312 also connect to a display 320.

Display 320 provides a mechanism to display data to a user and may be, for example, a computer monitor. In some examples, a GUI associated with the PaaS manager interface 104 of FIG. 1 may be presented on the display 320.

Figure 4:
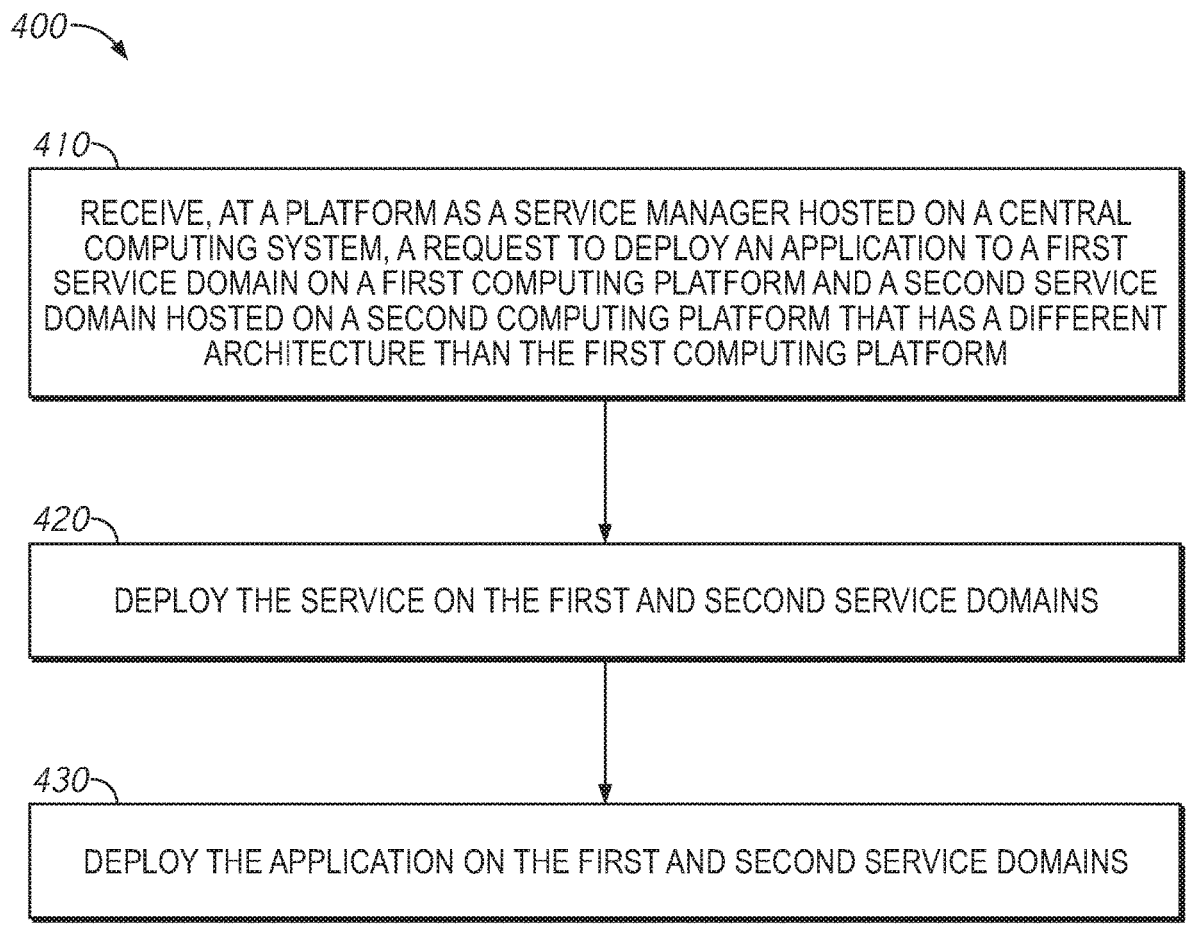
FIG. 4 is a flow diagram of a method to create an application for deployment to a computing platform, in accordance with an embodiment of the present disclosure.
Figure 5A:
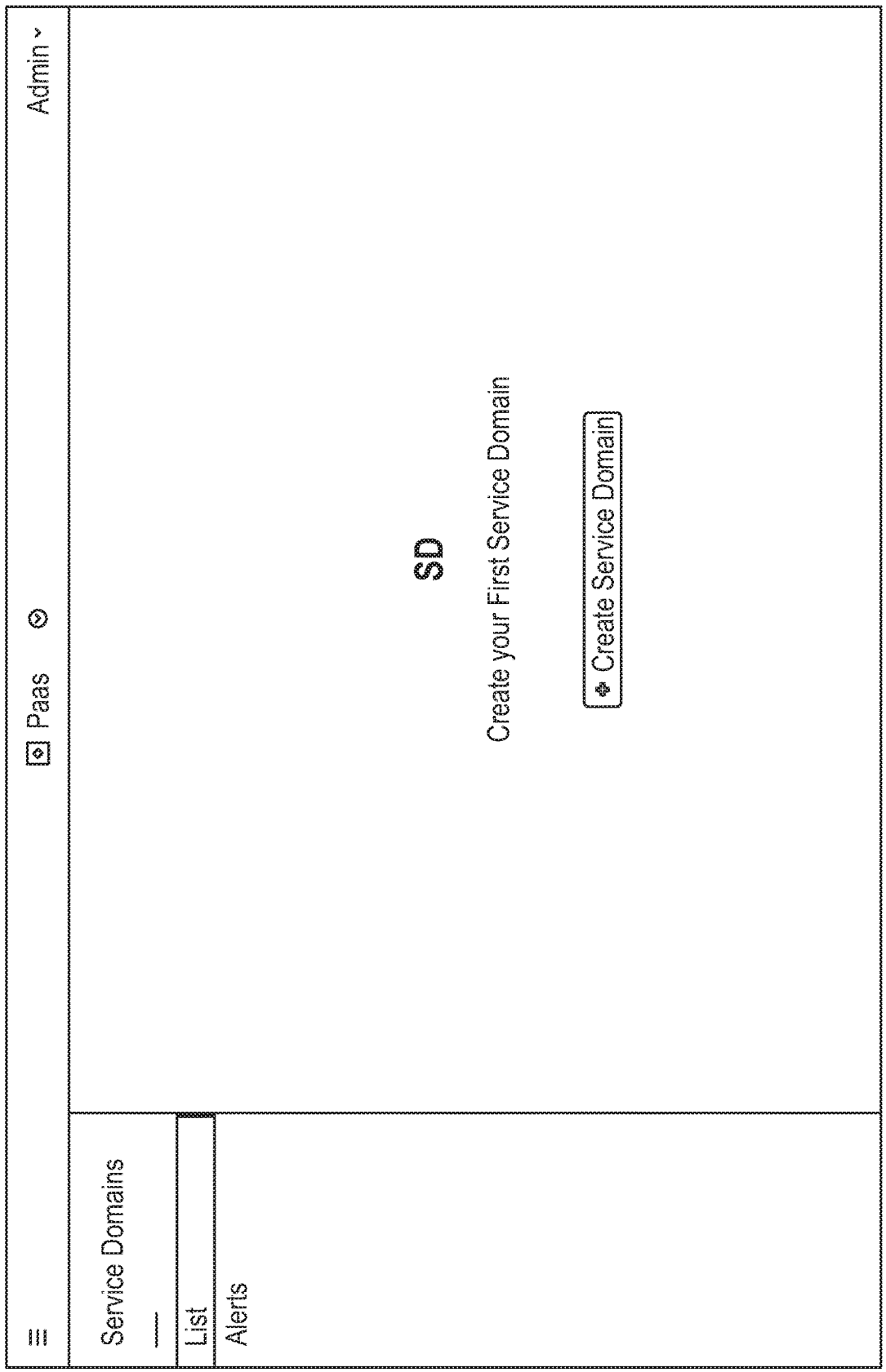

FIG. 4 is a flow diagram of a method 400 to create an application for deployment to a computing platform, in accordance with an embodiment of the present disclosure. The method 400 may be performed by the PaaS manager 142 of FIG. 1 and/or the PaaS manager 307 of FIG. 3.

The method 400 may include receiving, at a platform as a service manager hosted on a central computing system, a request to deploy an application to a first service domain on a first computing platform and a second service domain hosted on a second computing platform that has a different architecture than the first computing platform, at 410. The application utilizes an abstraction of a service. The first and second computing platforms may include any of the computing platforms of FIG. 1 configured to host computing cluster service domain(s) 112, the bare metal system service domain(s) 114, and or the cloud computing system service domain(s) 150, and/or the host computing platform 204 of FIG. 2. In some examples, the application includes at least one of a containerized application, a data pipeline, a machine learning model, or a data service. In some examples, the method 400 may further include providing a list of service domains available for deployment of the application, including the first and second service domains.

In some examples, the method 400 may further include, deploying each of the first service domain and the second service domain to a respective cloud computing platform, a computing node cluster platform, a bare metal platform, or an edge platform. In some examples, the method 400 may further include deploying a third service domain to a third computing platform having an architecture different than the first and second computing platforms in response to receipt of a request to generate the third service domain. In some examples, the first and second service domains each include a respective at least one virtual machine hosted on the first and second computing platforms, respectively. In some examples, the method 400 may further include providing a platform as a service software stack to the first and/or second computing platforms to deploy the first and/or second service domains, respectively.

The method 400 may further include deploying the service on the first and second service domains, at 420. In some examples, the method 400 may further include deploying at least one of a runtime service, a data service, or tool to the first and second service domains. The method 400 may further include deploying the application on the first and second service domains, at 430. In some examples, the method 400 may further include training a machine learning model for inclusion in the application based on data received from an external data source.

The method 400 may be implemented as instructions stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform the method 400.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. At least one non-transitory computer-readable storage medium including instructions that, when executed by a computing node, cause the computing node to:
   generate, by a platform-as-a-service (PaaS) manager, a first service domain for installation on a first computing platform based on a first architecture and a second service domain for installation on a second computing platform based on a second architecture different from the first architecture;
   receive, at the PaaS manager hosted on a central computing system, a request to deploy an application to the first service domain on the first computing platform and the second service domain hosted on the second computing platform, wherein the application utilizes a service;
   deploy the service on the first and second service domains, wherein the service is configured for deployment to multiple different service domains, including the first service domain and the second service domain; and
   deploy the application on the first and second service domains, wherein the first and second service domains provide a common platform to host the service and the application, and wherein each of the first computing platform hosting the first service domain and the second computing platform hosting the second service domain are separate from the PaaS manager hosted on the central computing system.

2. The at least one computer-readable storage medium of claim 1, wherein the instructions further cause the computing node to provide a list of service domains available for deployment of the application, including the first and second service domains.

3. The at least one computer-readable storage medium of claim 1, wherein the instructions further cause the computing node to deploy a third service domain to a third computing platform having an architecture different than the first and second computing platforms in response to receipt of a request to generate the third service domain.

4. The at least one computer-readable storage medium of claim 1, wherein the instructions further cause the computing node to deploy the first service domain to a cloud computing platform, a computing node cluster platform, a bare metal platform, or an edge platform as the first computing platform.

5. The at least one computer-readable storage medium of claim 1, wherein the instructions further cause the computing node to receive at least one of a containerized application, a data pipeline, or a machine learning model, as the application.

6. The at least one computer-readable storage medium of claim 1, wherein the instructions further cause the computing node to deploy at least one of a runtime service, a data service, or a tool to the first and second service domains.

7. The at least one computer-readable storage medium of claim 1, wherein the instructions further cause the computing node to deploy the first and second service domains to the first and second computing platforms, respectively.

8. The at least one computer-readable storage medium of claim 7, wherein the instructions further cause the computing node to start a first virtual machine on the first computing platform to deploy the first service domain.

9. The at least one computer-readable storage medium of claim 7, wherein the instructions further cause the computing node to provide a platform as a service software stack to the first computing platform to deploy the first service domain.

10. The at least one computer-readable storage medium of claim 1, wherein the instructions further cause the computing node to train a machine learning model for inclusion in the application based on data received from an external data source.

11. A system, comprising:
a first service domain hosted on a first computing platform having a first architecture, wherein the first service domain includes a set of services;
a second service domain hosted on a second computing platform having a second architecture, wherein the second service domain includes the set of services; and
a platform-as-a-service (PaaS) manager hosted on a computing node, the computing node comprising at least one processor and memory storing instructions, which, when executed by the at least one processor, cause the PaaS manager to perform operations comprising:
in response to receipt of a request from a user to install the first and second service domains on the first and second computing platforms, respectively, generate the first service domain for installation on the first computing platform based on the first architecture and generate the first service domain for installation on the second computing platform based on the second architecture, and
deploy an application or a service on the first and second service domains, wherein the application and the service are configured for deployment to multiple difference service domains, including the first serviced domain and the second service domain, wherein the first and second service domains provide a common platform to host the service and the application, and wherein each of the first computing platform hosting the first service domain and the second computing platform hosting the second service domain are separate from the PaaS manager hosted on the computing node.

12. The system of claim 11, wherein the PaaS manager is configured to generate the first service domain for installation on the first computing platform having a first cloud architecture and generate the first service domain for installation on the second computing platform having a second cloud architecture.

13. The system of claim 11, wherein the PaaS Manager is further configured to deploy the application on the first and second service domains in response to receipt of a request to deploy the application to the first and second service domains, wherein the application utilizes a service of the set of services.

14. The system of claim 11, wherein, in response to receipt of a request from the user to install a third service domain on a third computing platform, the PaaS manager is configured to generate a third service domain for installation on the third computing platform having an architecture different than the first and second computing platforms.

15. The system of claim 11, wherein the PaaS manager is further configured to receive at least one of a containerized application, a data pipeline, or a machine learning model for installation on one of the first and second service domains.

16. The system of claim 11, wherein the PaaS manager is configured to include at least one of a runtime service, a data service, or a tool in the set of services.

17. The system of claim 11, wherein the first service domain is installed in a virtual machine hosted on the first computing platform.

18. The system of claim 11, wherein the PaaS manager is further configured to train a machine learning model for inclusion in an application to be hosted in the first or second service domain based on data received from an external data source.

19. A method, comprising:
generating, by a platform-as-a-service (PaaS) manager, a first service domain for installation on a first computing platform based on a first architecture and a second service domain for installation on a second computing platform based on a second architecture different from the first architecture;
receiving, at the PaaS manager hosted on a central computing system, a request to deploy an application to the first service domain on the first computing platform and the second service domain hosted on a second computing platform, wherein the application utilizes a service;
deploying the service on the first and second service domains, wherein the service is configured for deployment to multiple different service domains, including the first service domain and the second service domain; and
deploying the application on the first and second service domains, wherein the first and second service domains provide a common platform to host the service and the application, and wherein each of the first computing platform hosting the first service domain and the second computing platform hosting the second service domain are separate from the PaaS manager hosted on the central computing system.

20. The method of claim 19, further comprising providing a list of service domains available for deployment of the application, including the first and second service domains.

21. The method of claim 19, further comprising deploying a third service domain to a third computing platform having an architecture different than the first and second computing platforms in response to receipt of a request to generate the third service domain.

22. The method of claim 19, further comprising deploying the first service domain to a cloud computing platform, a computing node cluster platform, a bare metal platform, or an edge platform as the first computing platform.

23. The method of claim 19, further comprising receiving at least one of a containerized application, a data pipeline, or a machine learning model, as the application.

24. The method of claim 19, further comprising deploying at least one of a runtime service, a data service, or tool to the first and second service domains.

25. The method of claim 19, further comprising deploying the first and second service domains to the first and second computing platforms, respectively.

26. The method of claim 25, further comprising starting a first virtual machine on the first computing platform to deploy the first service domain.

27. The method of claim 25, further comprising providing a platform as a service software stack to the first computing platform to deploy the first service domain.

28. The method of claim 19, further comprising training a machine learning model for inclusion in the application based on data received from an external data source.

29. The at least one computer-readable storage medium of claim 7, wherein the instructions further cause the computing node to deploy the first service domain to the first computing platform having the first architecture and the second service domain to the second computing platform having the second architecture, the first service domain including platform-specific software configured to operate on the first architecture, and the second service domain including platform-specific software configured to operate on the second architecture.

30. The at least one computer-readable storage medium of claim 29, wherein the instructions further cause the computing node to deploy the service to first service domain based on a determination that the platform-specific software of the first service domain is capable of hosting the service.

31. The system of claim 11, wherein the first service domain includes platform-specific software configured to operate on the first architecture and the second service domain includes platform-specific software configured to operate on the second architecture.

32. The method of claim 25, further comprising deploying the first service domain to the first computing platform having the first architecture and the second service domain to the second computing platform having the second architecture, the first service domain including platform-specific software configured to operate on the first architecture, and the second service domain including platform-specific software configured to operate on the second architecture.

33. The method of claim 32, further comprising deploying the service to first service domain based on a determination that the platform-specific software of the first service domain is capable of hosting the service.

34. A system, comprising:
a first service domain generated by a platform-as-a-service (PaaS) manager for installation on a first computing platform having a first architecture, wherein the first service domain includes platform-specific software configured to operate on the first architecture;
a second service domain generated by the PaaS manager for installation on a second computing platform having a second architecture, wherein the second service domain includes platform-specific software configured to operate on the second architecture, wherein the second architecture is different than the first architecture; and
the platform-as-a-service (PaaS) manager hosted on a computing node, the computing node comprising at least one processor and memory storing instructions, which, when executed by the at least one processor, cause the PaaS manager to perform operations comprising:
deploy the first service domain to the first computing platform and the second service domain to the second computing platform,
receive a request to deploy an application to the first service domain and the second service domain, wherein the application utilizes a service included in the first and second service domains,
in response to the request, deploy the service on the first and second service domains and deploy the application on the first and second service domains, wherein the service is configured for deployment to multiple different service domains, including the first service domain and the second service domain,
wherein the first and second service domains provide a common platform to host the service and the application, and
wherein each of the first computing platform hosting the first service domain and the second computing platform hosting the second service domain are separate from the PaaS manager hosted on the computing node.

35. The system of claim 34, wherein the PaaS manager is configured to provide a list of service domains available for deployment of the application, including the first and second service domains, in response to receipt of the request.

36. The system of claim 34, wherein the PaaS manager is configured to deploy the first service domain to a cloud computing platform, a computing node cluster platform, a bare metal platform, or an edge platform as the first computing platform.

37. The system of claim 34, wherein the PaaS manager is configured to receive at least one of a containerized application, a data pipeline, or a machine learning model, as the application.

38. The system of claim 34, wherein the PaaS manager is configured to start a first virtual machine on the first computing platform to deploy the first service domain.

39. The at least one computer-readable storage medium of claim 1, wherein the first computing platform includes a different host operating system than the second computing platform.

40. The at least one computer-readable storage medium of claim 1, wherein the first computing platform includes a different hypervisor than the second computing platform.

41. The at least one computer-readable storage medium of claim 1, wherein the first computing platform comprises a cloud platform and the second computing platform comprises a bare metal platform.

42. The system of claim 11, wherein the first computing platform includes a different host operating system than the second computing platform.

43. The system of claim 11, wherein the first computing platform includes a different hypervisor than the second computing platform.

44. The system of claim 11, wherein the first computing platform comprises a cloud platform and the second computing platform comprises a bare metal platform.

45. The method of claim 19, wherein the first computing platform includes a different host operating system than the second computing platform.

46. The method of claim 19, wherein the first computing platform includes a different hypervisor than the second computing platform.

47. The method of claim 19, wherein the first computing platform comprises a cloud platform and the second computing platform comprises a bare metal platform.

48. The system of claim 34, wherein the first computing platform includes a different host operating system than the second computing platform.

49. The system of claim 34, wherein the first computing platform includes a different hypervisor than the second computing platform.

50. The system of claim 34, wherein the first computing platform comprises a cloud platform and the second computing platform comprises a bare metal platform.

* * * * *